US012494058B2

(12) United States Patent
Griffin

(10) Patent No.: US 12,494,058 B2
(45) Date of Patent: Dec. 9, 2025

(54) RELATIONSHIP MODELING AND KEY FEATURE DETECTION BASED ON VIDEO DATA

(71) Applicant: Insight Direct USA, Inc., Tempe, AZ (US)

(72) Inventor: Michael Griffin, Wayland, MA (US)

(73) Assignee: Insight Direct USA, Inc., Chandler, AZ (US)

( * ) Notice: Subject to any disclaimer, the term of this patent is extended or adjusted under 35 U.S.C. 154(b) by 440 days.

(21) Appl. No.: 17/952,002

(22) Filed: Sep. 23, 2022

(65) Prior Publication Data

US 2023/0177835 A1 Jun. 8, 2023

Related U.S. Application Data

(60) Provisional application No. 63/405,721, filed on Sep. 12, 2022, provisional application No. 63/405,716, (Continued)

(51) Int. Cl.
*G06V 20/40* (2022.01)
*G06F 18/22* (2023.01)
(Continued)

(52) U.S. Cl.
CPC ............. *G06V 20/41* (2022.01); *G06F 18/22* (2023.01); *G06F 40/30* (2020.01); *G06V 10/426* (2022.01);
(Continued)

(58) Field of Classification Search
CPC .. G06V 20/41; G06V 10/7753; G06V 10/774; G06V 40/20; G06V 10/426;
(Continued)

(56) References Cited

U.S. PATENT DOCUMENTS 8,533,134 B1 * 9/2013 Zhao ..................... G06F 16/35
706/12
9,436,760 B1 * 9/2016 Tacchi ................ G06F 16/9024
(Continued)

OTHER PUBLICATIONS

"ThinkPad E550 Platform Specifications" Product Specifications Reference (PSREF) Lenovo (GDN1-Spec) Aug. 2015 (Year: 2015).*

*Primary Examiner* — John Villecco
*Assistant Examiner* — Alexander John Rodgers
(74) *Attorney, Agent, or Firm* — Kinney & Lange, P.A.

(57) ABSTRACT

A method includes acquiring digital video data that portrays an interacting event, extracting image data, audio data, and semantic text data from the video data, analyzing the extracted data to identify a plurality of video features, and analyzing the plurality of video features to create a relationship graph. The interacting event comprises a plurality of interactions between plurality of individuals and the relationship graph comprises a plurality of nodes and a plurality of edges. Each node of the plurality of nodes represents an individual of the plurality of individuals, and each edge of the plurality of edges extends between two nodes of the plurality of nodes, and the plurality of edges represents the plurality of interactions. The method further comprises determining whether a first key feature is present in the relationship graph, wherein presence of the first key feature is predictive of a positive outcome of the interacting event.

18 Claims, 9 Drawing Sheets

Related U.S. Application Data filed on Sep. 12, 2022, provisional application No. 63/405,722, filed on Sep. 12, 2022, provisional application No. 63/405,719, filed on Sep. 12, 2022, provisional application No. 63/286,844, filed on Dec. 7, 2021.

(51) Int. Cl.

| | |
|---|---|
| *G06F 40/30* | (2020.01) |
| *G06V 10/426* | (2022.01) |
| *G06V 10/44* | (2022.01) |
| *G06V 10/70* | (2022.01) |
| *G06V 10/74* | (2022.01) |
| *G06V 10/774* | (2022.01) |
| *G06V 10/86* | (2022.01) |
| *G06V 20/70* | (2022.01) |
| *G06V 30/262* | (2022.01) |
| *G06V 40/20* | (2022.01) |
| *G10L 25/57* | (2013.01) |

(52) U.S. Cl.
CPC .............. *G06V 10/44* (2022.01); *G06V 10/70* (2022.01); *G06V 10/761* (2022.01); *G06V 10/774* (2022.01); *G06V 10/7753* (2022.01); *G06V 10/86* (2022.01); *G06V 20/46* (2022.01); *G06V 20/70* (2022.01); *G06V 30/274* (2022.01); *G06V 40/20* (2022.01); *G10L 25/57* (2013.01)

(58) Field of Classification Search
CPC ...... G06V 30/274; G06V 10/44; G06V 10/70; G06V 10/761; G06V 20/46; G06V 10/86; G06V 20/70; G10L 25/57; G06F 18/22; G06F 40/30
See application file for complete search history.

(56) References Cited

U.S. PATENT DOCUMENTS

| | | | |
|---|---|---|---|
| 9,710,544 B1 | 7/2017 | Smith et al. | |
| 10,489,462 B1* | 11/2019 | Rogynskyy | ............. H04L 12/14 |
| 10,943,072 B1* | 3/2021 | Jaganmohan | .......... G06N 5/041 |
| 11,483,408 B2* | 10/2022 | Rossi | .................... H04L 43/045 |
| 11,694,281 B1* | 7/2023 | Liu | ........................ G06F 40/30 |
| | | | 704/9 |
| 11,837,229 B1* | 12/2023 | Fan | ..................... G10L 15/1822 |
| 2008/0080743 A1* | 4/2008 | Schneiderman | ..... G08B 13/196 |
| | | | 382/118 |
| 2016/0036661 A1* | 2/2016 | Sachdev | ................ G06Q 50/01 |
| | | | 709/204 |
| 2016/0125346 A1* | 5/2016 | Krantz | ................... G06F 3/0484 |
| | | | 705/7.41 |
| 2017/0017638 A1* | 1/2017 | Satyavarta | ............ G06F 40/253 |
| 2017/0300823 A1* | 10/2017 | Bostick | ................ H04L 67/306 |
| 2019/0066136 A1 | 2/2019 | Kopikare | |
| 2019/0251169 A1* | 8/2019 | Loghmani | ............. G06F 40/295 |
| 2019/0251359 A1 | 8/2019 | Pranger et al. | |
| 2020/0218989 A1* | 7/2020 | Mei | .......................... G06N 5/02 |
| 2020/0285700 A1 | 9/2020 | Narayanan et al. | |
| 2020/0365188 A1 | 11/2020 | Brinkman et al. | |
| 2021/0056172 A1* | 2/2021 | Bastide | ................. H04L 51/046 |
| 2021/0089624 A1* | 3/2021 | Bealby-Wright | ....... G10L 15/16 |
| 2021/0182317 A1* | 6/2021 | Gadek | ................ G06F 40/284 |
| 2021/0248375 A1* | 8/2021 | Geng | ................. G06F 16/9035 |
| 2021/0272040 A1* | 9/2021 | Johnson | ................. G06N 5/022 |
| 2021/0312919 A1* | 10/2021 | Sato | ..................... G06F 16/3329 |
| 2021/0350125 A1* | 11/2021 | Arvela | ................. G06V 30/418 |
| 2021/0374356 A1* | 12/2021 | He | ......................... G06N 5/022 |
| 2022/0147547 A1* | 5/2022 | Kwatra | ............... G06F 16/337 |
| 2022/0164548 A1* | 5/2022 | Tumuluri | ............... G06N 3/084 |
| 2022/0224659 A1* | 7/2022 | El Ghazzal | ............ G06N 20/00 |
| 2022/0270636 A1* | 8/2022 | Tao | ......................... G06F 40/284 |
| 2023/0020834 A1* | 1/2023 | Chatterjee | ................ G06N 3/08 |
| 2023/0186120 A1 | 6/2023 | Zhao et al. | |
| 2023/0325630 A1* | 10/2023 | Wu | ......................... G06N 3/044 |
| | | | 706/25 |
| 2024/0312252 A1 | 9/2024 | Qiu et al. | |

* cited by examiner

RELATIONSHIP MODELING AND KEY FEATURE DETECTION BASED ON VIDEO DATA

CROSS-REFERENCE TO RELATED APPLICATION(S)

This application claims the benefit of U.S. Provisional Application No. 63/286,844 filed Dec. 7, 2021 for "MACHINE LEARNING METHOD TO QUANTIFY PRESENT STATE-OF-MIND AND PREDICT FUTURE STATE-OF-MIND OF ONE OR MORE INDIVIDUALS BASED ON VIDEO IMAGES OF THOSE INDIVIDUALS" by M. Griffin, H. Kotvis, K. Lumb, K. Poulson, and J. Miner, the disclosure of which is incorporated in its entirety by reference herein; of U.S. Provisional Application 63/405,716 filed Sep. 12, 2022 for "RELATIONSHIP MODELING AND EVALUATION BASED ON VIDEO DATA" by M. Griffin, the disclosure of which is incorporated in its entirety by reference herein; of U.S. Provisional Application 63/405,719 filed Sep. 12, 2022 for "RELATIONSHIP MODELING AND ANOMALY DETECTION BASED ON VIDEO DATA" by M. Griffin, the disclosure of which is incorporated in its entirety by reference herein; of U.S. Provisional Application 63/405,721 filed Sep. 12, 2022 for "RELATIONSHIP MODELING AND KEY FEATURE DETECTION BASED ON VIDEO DATA" by M. Griffin, the disclosure of which is incorporated in its entirety by reference herein; and of U.S. Provisional Application 63/405,722 filed Sep. 12, 2022 for "RELATIONSHIP MODELING AND ADJUSTMENT BASED ON VIDEO DATA" by M. Griffin, the disclosure of which is also incorporated in its entirety by reference herein.

BACKGROUND

The present disclosure relates to relationship evaluation and, more particularly, systems and methods for automatically evaluating relationships using video data.

Individuals interact with others in social and professional contexts and can form relationships through those interactions. It can be difficult to evaluate the strength of the relationship between two or more individuals by observing the interactions between those individuals. Further, it is difficult to evaluate relationships among individuals in real-time, especially for individuals having impairments that decrease the ability of those individuals to interpret verbal and/or non-verbal information.

SUMMARY

An embodiment of a method according to the present disclosure includes acquiring digital video data that portrays an interacting event, extracting image data, audio data, and semantic text data from the video data, analyzing at least one of the image, audio, and semantic text data to identify a plurality of video features with a first computer-implemented machine learning model, and analyzing the plurality of video features to create a relationship graph. The interacting event comprises a plurality of interactions between a plurality of individuals and the relationship graph comprises a plurality of nodes and a plurality of edges. Each node of the plurality of nodes represents an individual of the plurality of individuals, and each edge of the plurality of edges extends between two nodes of the plurality of nodes, and the plurality of edges represents the plurality of interactions. The method further comprises determining whether a first key feature is present in the relationship graph and outputting, by a user interface, an indication of whether the first key feature is present. Presence of the first key feature is predictive of a positive outcome of the interacting event.

An embodiment of a system according to the present disclosure includes a camera device for acquiring digital video data, a processor, a user interface, and a memory. The memory is encoded with instructions that, when executed, cause the processor to acquire digital video data from the camera, extract image data, audio data, and semantic text data from the digital video data, analyze at least one of the image data, the audio data, and the semantic text data to identify a plurality of video features in the digital video data with a first computer-implemented machine learning model, and analyze the plurality of video features to create a relationship graph. The digital video data portrays an interacting event comprising a plurality of interactions between plurality of individuals and the relationship graph comprises a plurality of nodes and a plurality of edges. Each node of the plurality of nodes represents an individual of the plurality of individuals, and each edge of the plurality of edges extends between two nodes of the plurality of nodes, and the plurality of edges represents the plurality of interactions. The memory is further encoded with instructions that, when executed, cause the processor to determine whether a first key feature is present in the relationship graph and output, by a user interface, an indication of whether the first key feature is present in the relationship graph. Presence of the first key feature is predictive of a positive outcome of the interacting event.

A further embodiment of a method according to the present disclosure includes acquiring training video data that portrays a plurality of interacting events, labeling each interacting event of the plurality of interacting events as positive or negative to create a plurality of positive interacting events and a plurality of negative interacting events, creating a plurality of positive relationship graphs, and creating a plurality of negative relationship graphs. The plurality of positive relationship graphs are created by, for each positive interacting event, extracting positive training image data, positive training audio data, and positive semantic text data from the training video data, analyzing at least one of the positive training image data, the positive training audio data, and the positive semantic text data to identify a plurality of positive training video features, and analyzing the plurality of positive training video features to create a positive relationship graph. The plurality of negative relationship graphs are created by, for each negative interacting event, extracting negative training image data, negative training audio data, and negative semantic text data from the training video data, analyzing at least one of the negative training image data, the negative training audio data, and the negative semantic text data to identify a plurality of negative training video features, and analyzing the plurality of negative training video features to create a negative relationship graph. The pluralities of positive and negative training video features are analyzed using a first computer-implemented machine learning model. Each positive relationship graph includes a plurality of positive training nodes and a plurality of positive training edges extending between nodes of the plurality of positive training nodes. Each negative relationship graph includes a plurality of negative training nodes and a plurality of negative training edges extending between nodes of the plurality of negative training nodes. The method further includes analyzing the plurality of positive relationship graphs to identify a plurality of positive graph features, analyzing the plurality of negative relationship graphs to identify a plurality of negative graph features, training a second computer-implemented machine learning model to identify positive and negative interacting events with the plurality of positive graph features and the plurality of negative graph features, and identifying a key feature using the trained second computer-implemented machine learning model. According to the trained second computer-implemented machine learning model, the key feature has a predictive power above a threshold predictive power.

DETAILED DESCRIPTION

The present disclosure relates to systems and methods for creating node and edge graphs describing relationships among a group of individuals based on video footage of those individuals interacting. The present disclosure further relates to systems and methods for detecting key features present in those graphs. As will be explained in more detail subsequently, key features are features present in a relationship graph that are associated with an event described by the node and edge graph having a positive outcome. The systems and methods disclosed herein allow for the selection of key features from relationship graph information by training machine learning classification models, reducing and/or eliminating the need for subjective human judgment to understand what elements of an interaction are important for a positive outcome.

The relationship graphs described herein describe relationships during a set of interactions of a group of individuals with significant more granularity than existing methods. Due to the granularity with which the relationship graphs described herein describe interactions between individuals, the granularity allows for outlier identification on an interaction-by-interaction basis and in an automated manner. In some examples, the relationship graphs described herein allow for individual actions to be identified as key features that are associated with positive event outcomes, and recommendations or instructions for performing those interactions and/or actions in subsequent interactions can be generated automatically, allowing individuals unskilled in improving social interactions to more easily understand what interactions and/or actions result in positive event outcomes.

Figure 1:
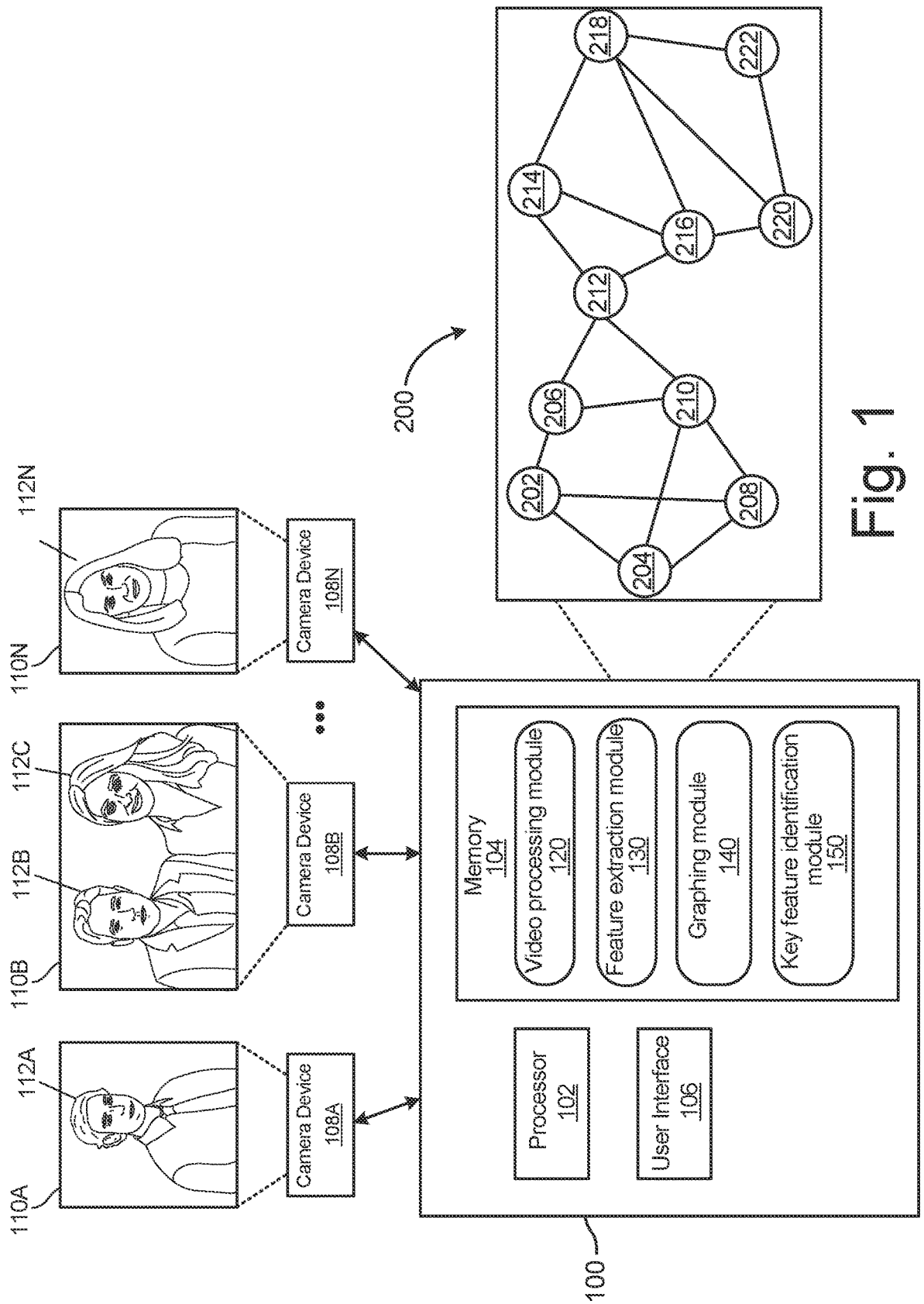
FIG. 1 is a schematic diagram of an example of a system for relationship evaluation.

FIG. 1 is a schematic diagram of relationship evaluator 100, which is a system for evaluating relationships of two or more individuals. Relationship evaluator 100 is configured to evaluate relationships by creating node and edge graphs representative of relationships among two or more individuals and determining whether key features are present in those graphs. Relationship evaluator 100 includes processor 102, memory 104, and user interface 106, and is connected to camera devices 108A-N. Camera devices 108A-N capture video data 110A-N of individuals 112A-N. Memory 104 includes video processing module 120, feature extraction module 130, graphing module 140, and key feature detection module 150. Memory 104 also stores relationship graph 200, which is an edge and node graph created by graphing module 140. Relationship graph 200 includes nodes 202, 204, 206, 208, 210, 212, 214, 216, 218, 220, and 222. Each of nodes 202, 204, 206, 208, 210, 212, 214, 216, 218, 220, 222 are connected to another of nodes 202, 204, 206, 208, 210, 212, 214, 216, 218, 220, 222 by at least one edge.

Processor 102 can execute software, applications, and/or programs stored on memory 104. Examples of processor 102 can include one or more of a processor, a microprocessor, a controller, a digital signal processor (DSP), an application specific integrated circuit (ASIC), a field-programmable gate array (FPGA), or other equivalent discrete or integrated logic circuitry. Processor 102 can be entirely or partially mounted on one or more circuit boards.

Memory 104 is configured to store information and, in some examples, can be described as a computer-readable storage medium. Memory 104, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 104 is a temporary memory. As used herein, a temporary memory refers to a memory having a primary purpose that is not long-term storage. Memory 104, in some examples, is described as volatile memory. As used herein, a volatile memory refers to a memory that that the memory does not maintain stored contents when power to the memory 104 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on relationship evaluator 100 (e.g., by a computer-implemented machine learning model or a data processing module) to temporarily store information during program execution.

Memory 104, in some examples, also includes one or more computer-readable storage media. Memory 104 can be configured to store larger amounts of information than volatile memory. Memory 104 can further be configured for long-term storage of information. In some examples, memory 104 includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interface 106 is an input and/or output device and enables an operator to control operation of relationship evaluator 100. For example, user interface 106 can be configured to receive inputs from an operator and/or provide outputs. User interface 106 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Relationship evaluator 100 is configured to perform one or more methods described herein. Relationship evaluator 100 can accept data from and/or can be operably connected to an audiovisual data stream and/or an audiovisual data file. Relationship evaluator 100 can use data from an audiovisual data stream and/or an audiovisual data file to determine relationship graph and/or key feature information. More generally, relationship evaluator 100 is configured to perform any of the functions attributed herein to a relationship evaluator, including receiving an output from any source referenced herein, detecting any condition or event referenced herein, and generating and providing data and information as referenced herein.

Relationship evaluator 100 can be a discrete assembly or be formed by one or more devices capable of individually or collectively implementing functionalities and generating and outputting data as discussed herein. In some examples, relationship evaluator 100 can be implemented as a plurality of discrete circuitry subassemblies. In some examples, relationship evaluator 100 can include or be implemented at least in part as a smartphone or tablet, among other options. In some examples, relationship evaluator 100 and/or user interface 106 of relationship evaluator 100 can include and/or be implemented as downloadable software in the form of a mobile application. The mobile application can be implemented on a computing device, such as a personal computer, tablet, or smartphone, among other suitable devices. Relationship evaluator 100 can be considered to form a single computing device even when distributed across multiple component devices.

Camera devices 108A-N are capable of capturing video data 110A-N of one or more individuals 112A-N. In the depicted example, camera devices 108A and 108N are depicted as capturing video data 110A and 110N of single individuals 112A and 112N. Camera device 108B is depicted as capturing video data 110B of two individuals 112B and 112C. Each camera device 108A-N captures video data 110A-N of one or more individuals 112A-N. Each camera device 108A-N is configured to be able to communicate with relationship evaluator 100 and relationship evaluator 100 is configured to communicate with each camera device 108A-N. Camera devices 108A-N can be, for example, a video camera, a webcam, or another suitable source for obtaining video data 110A-N. Camera devices 108A-N can be controlled by relationship evaluator 100 or by another suitable video device. Video data 110A-N are audiovisual data feeds portraying individuals 112A-N. Video data 110A-N can be stored to memory 104 for use with one or more methods described herein or can be stored to another storage media and recalled to memory 104 for use with one or more methods described herein.

Although FIG. 1 depicts only three camera devices 108A-N, relationship evaluator 100 can be operatively connected to any number of camera devices 108A-N. Each additional camera device 108A-N can capture video data 110A-N portraying one or more additional individuals 112A-N. Similarly, although each of video data 110A-N is depicted as portraying a single individual 112A-N, in other examples each of video data 110A-N can depict two or more individuals 112A-N. In some examples, relationship evaluator 100 includes only one camera that captures video data of all individuals 112A-N.

Individuals 112A-N are participating in an interacting event. As used herein, an "interacting event" refers to an event where the individuals 112A-N interact with each other through one or more interactions. The interacting event can be, for example, a meeting, a presentation, a sales pitch, a negotiation, or a conference, among other options. Each interaction that occurs during the interacting event is associated with at least two people. For each interaction, one individual performs an action toward at least one other individual, where the actions are selected and/or intended to have an effect on the other individual(s). Each action can include, for example, one or more words, one or more gestures, and/or one or more audible noises, among other options. For example, an individual can orally speak a statement (e.g., one or more sentences expressing an idea, thought, and/or concept) and physically perform one or more gestures to complement the spoken words of the statement. The statement can be directed at one or more other individuals. In some examples, the statement and the gestures accompanying the statement can be treated as a single interaction. Additionally and/or alternatively, the statement and the gestures accompanying can be treated as separate interactions. Where a statement includes multiple sub-statements that are linguistically separable, each sub-statement can also be treated as a separate interaction.

Video processing module 120 includes one or more programs for processing video data 110A-N. For example, video processing module 120 can include one or more programs for extracting image data, audio data, and semantic text data from video data 110A-N. As used herein, "image data" refers to the portion of video data 110A-N that is a series of still images, "audio data" refers to the sound data stored in video data 110A-N, and "semantic text data" refers to data that represents spoken words, phrases, sentences, and other sounds produced by the individual as readable text.

Feature extraction module 130 includes one or more programs for classifying the image data, audio data, and semantic text data extracted by video processing module 120. Feature extraction module 130 can include one or more programs for extracting classifiable features from the image data, audio data, and/or semantic text data. In some examples, feature extraction module 130 can include one or more computer-implemented machine learning models for extracting classifiable features from the image data, audio data, and/or semantic text data. The features extracted by feature extraction module 130 describe interactions captured by camera devices 108A-N and are referred to herein as "video features."

Graphing module 140 includes one or more programs for transforming video features extracted by feature extraction module 130 into a relationship graph. Each relationship graph created by graphing module 140 includes a plurality of nodes and a plurality of edges. Each node of a relationship graph represents each of individuals 112A-N involved in a particular interacting event and each edge is representative of one or more video features extracted by feature extraction module 130 from video data 110A-N of that interacting event. Graphing module 140 includes one or more programs for identifying individuals and creating nodes of a relationship graph. Similarly, graphing module 140 includes one or more programs for transforming video features extracted by feature extraction module 130 into edges that connect the nodes of the relationship graph.

Processor 102 can use programs of graphing module 140 and information describing the identities of individuals 112A-N to create the nodes of the relationship graph. The identity information can be determined by, for example, analyzing data from video processing module 120 with one or more programs of feature extraction module 130 to identify video features representative of identity. For example, graphing module 140 can also include one or more programs for identifying individuals 112A-N in video data 110A-N based on video features extracted by feature extraction module 130. Graphing module 140 can further include one or more programs for associating video features extracted by feature extraction module 130 with each of individuals 112A-N. An individual 112A-N can be identified by, for example, cross-referencing features with a table or array that relates video features to identity. Additionally and/or alternatively, a machine learning model trained to identify an individual 112A-N based on a training set of features from image, audio, and/or semantic text data can be used to identify individuals 112A-N for creating nodes of the relationship graph. In examples where the individual 112A-N is identified, the nodes of the relationship graph can include, for example, descriptions of the name, title, or organizational position of the individual 112A-N, among other options. In other examples, descriptive identity information may not be available for one or more of individuals 112A-N. In these examples, the nodes of the relationship graph can include descriptions of the physical appearance, setting, built environment, or geographic location of the individual 112A-N, among other options. Feature extraction module 130 and/or graphing module 140 can include one or more programs for determining physical and/or environmental descriptions for each individual 112A-N represented as a node of the relationship graph.

Graphing module 140 can include one or more programs for creating an edge from each video feature extracted by feature extraction module 130. Each video feature extracted by feature extraction module 130 can be associated with at least one individual of individuals 112A-N captured in video data 110A-N by cameras 108A-N, such that each edge of the relationship graph can be associated with at least one node of the relationship graph. Graphing module 140 can also include one or more programs that, for each edge, are able to associate the edge with the nodes representative of the individuals associated with the feature represented by the edge. For example, for a video feature that describes a statement (e.g., a feature that describes words spoken in the statement), can be associated with the speaker and/or the recipients of the statement. Processor 102 can use one or more programs of graphing module 140 to create an edge for each recipient of the statement and to associate those edges with the speaker, such that for each recipient of the statement, processor 102 creates an edge extending from the speaker to the recipient. In some examples, the video features extracted by feature extraction module 130 are associated with all individuals involved in the interaction. Feature extraction module 130 and/or graphing module 140 can include one or more programs to automatically determine the individual that initiated an interaction described by the video feature and further to determine individuals that were the intended recipients of that interaction. As will be described in more detail subsequently, the edges created using the programs of graphing module 140 can be directed or undirected and can also be weighted or unweighted.

Processor 102 can use programs of graphing module 140 to create a relationship graph for an interacting event by organizing the node and edge data for the interacting event. The relationship graphs created by graphing module 140 represent the relationships of individuals 112A-N as captured in video data 110A-N of an interacting event. Advantageously, organizing video feature data extracted by feature extraction module 130 into the node and edge relationship graphs created by the programs of graphing module 140 significantly improves the ease with which patterns and data relationships can be identified within an extracted feature set for a particular interacting event. The relationship graph created by graphing module 140 can be represented as a table, a database, or a graphical image, among other options. In some examples, all edges extending between two nodes are combined into a single, weighted edge in the relationship graph data. In other examples, each edge is stored separately in the relationship graph. In some of these examples, the relationship graph also stores descriptions of the features corresponding to each edge, allowing analysis for the presence and/or absence of particular interactions during the interacting event represented by the relationship graph.

Key feature detection module 150 includes one or more programs for detecting key features within relationship graphs produced using graphing module 140. As referred to herein, "key features" are features of relationships graphs produced by graphing module 140 that are strongly associated with positive outcomes for an interacting event. The type and quantity of key features possible in a given relationship graph are dependent on the identity of the individuals involved in the interacting event, the quantity of individuals involved in the interacting event, and/or characteristics of the interacting event. For example, a key feature may only be predictive of a positive event outcome for a particular type of event, such as meetings, lectures, or classroom environments, among other options.

The key features identified by key feature identification module are selected by training one or more computer-implemented machine learning classification models to identify graphs with positive outcomes based on features extracted from those graphs. A training set of relationship graphs can be labeled representative of events with positive and/or negative outcomes, and features can be extracted from the training set of graphs. Generally, the interacting events described by the relationship graphs of the training set are of a similar type and, in some examples, are of the same group of individuals. Features extracted from relationships are referred to herein as "graph features." Graph features can include an arrangement of nodes, an arrangement of edges, a weight or number of edges extending between two nodes, or any other suitable feature extractable from node and edge relationship graphs. The graph features can be extracted by, for example, one or more programs (e.g., one or more machine learning models) of key feature detection module 150. A decision-tree based classification model can then be trained to classify graph features according to the labeled training set of graphs. Training of the decision-tree based classification model results in the creation of a classification tree that associates features extracted from the training set of graphs with their predictive power for predicting positive and/or negative event outcomes. Graph features that are highly predictive of positive and/or negative event outcomes can be stored as key features to a memory, such as memory 104. The individuals and/or actions associated with the node(s) and/or edge(s) of the key feature can also be stored to memory 104.

Key feature detection module 150 uses one or more programs, such as one or more computer-implemented machine learning models, to detect the presence of key features in relationship graphs created by graphing module 140. Where the interacting event depicted by a new relationship graph is sufficiently similar to the interacting events of the training set (e.g., where the event is of the same type or includes the same individuals), methods having low computational cost can be used to detect whether the key feature is present in the new relationship graph. In other examples, a further machine learning model can be trained to determine whether the key feature is present in a new relationship graph. For example, once the key feature is determined by training a classification model, actions and/or individuals with the node(s) and/or edge(s) of the key feature can be identified and a further training set of relationship graphs can be created to train a further machine learning recognition model to detect the node(s) and/or edge(s) of the key feature in relationship graphs depicted different combinations of individuals and/or different types of interacting events. Key feature detection module 150 can then use the trained recognition model to detect the presence of the key feature in new relationship graphs created using graphing module 140.

Key feature detection module 150 can include key feature information and/or detection programs for multiple types of interacting events. A user can provide an input at a user interface (e.g., user interface 106) to select the type of event and/or the identities of the individuals participating in a new interacting event described by a new relationship graph, and processor 102 can use the input to select the key features and/or detection program from key feature detection module 150.

Key feature detection module 150 can include one or more programs for creating an output indicative of whether the key feature is present in a relationship graph. The output can include one or more alphanumeric characters representative of whether the key feature is present in a given relationship graph. Key feature detection module 150 can also include one or more programs for creating and outputting an adjustment recommendation. If a relationship graph of an interacting event of a group of individuals does not include a key feature, processor 102 can execute the program(s) of key feature detection module 150 to create an adjustment recommendation for increasing the likelihood that the key feature appears in subsequent relationship graphs of subsequent interacting events of the group. The adjustment recommendation can be one or more actions that can be performed during a subsequent interacting event and/or prior to a subsequent interacting event to increase the likelihood that the key feature appears in a subsequent relationship graph. For example, the adjustment recommendation can be an instruction to one of the individuals of the group to perform or refrain from performing one or more actions. As a further example, the adjustment recommendation can be an instruction to an individual in a managerial role relative to the group to take one or more actions directed toward members of the group before a subsequent interacting event. The actions can be, for example, talking or providing another intervention to one or more individuals of the group. Memory 104 can store a table, array, and/or database that associates adjustment recommendations with key features, and processor 102 can cross-reference the table, array, and/or database to determine an adjustment recommendation associated with increasing the likelihood that the key feature appears on a subsequent graph of a subsequent interacting event between the members of the group.

Memory 104 can also include one or more programs for recognizing an interacting event. Each relationship graph generated by graphing module 140 describes one interacting event. However, in some examples video data 110A-N can include footage of more than one interacting event (e.g., footage of two consecutive interacting events). Memory 104 can include one or more programs for recognizing interacting events in a continuous video recording of multiple interacting events and for isolating the video data for each event. The video data for each event can then be processed using video processing module 120, feature extraction module 130, graphing module 140, and key feature detection module 150.

Relationship graph 200 is one example of a relationship graph that can be created by graphing module 140. Relationship graph 200 can be stored to memory 104 and key features within relationship graph 200 can be identified by key feature detection module 150. Relationship graph 200 includes nodes 202-222, which are connected by various edges. Node 202 is connected to nodes 204, 206, and 208. Node 204 is connected to nodes 202, 208, and 210. Node 206 is connected to nodes 202, 210, and 212. Node 208 is connected to nodes 202, 204, and 210. Node 210 is connected to nodes 204 and 206. Node 212 is connected to nodes 206, 210, 214, and 216. Node 214 is connected to nodes 212, 216, and 218. Node 216 is connected to nodes 212, 214, 218, and 220. Node 218 is connected to nodes 214, 216, 220, and 222. Node 220 is connected to nodes 216, 218, and 222. Node 222 is connected to nodes 218 and 220. Relationship graph 200 is a visual, plotted depiction of relationship graph information. The information depicted in relationship graph 200 can be stored in other manners (e.g., as a table, array, or database). The plotted depictions of relationship graphs herein are not limiting and are included for explanatory purposes.

The nodes of relationship graph 200 are arranged into two sub-groups. Specifically, nodes 202-210 form one subgroup that is linked to a second subgroup of nodes 214-222 by node 212. If, for example, relationship graph 200 described a meeting of workers in a hierarchically-arranged office environment, the arrangement of workers within the office hierarchy can be inferred from the from the distribution of nodes 202-222 and the edges interconnecting nodes 202-222. For example, it can be inferred that the individuals represented by nodes 206, 210, 216, and 214 are in a middle-management role between the individual represented by node 212, who likely has elevated managerial and/or decision-making duties, and the individuals represented by nodes 202, 204, 207, 218, 220, and 222, who likely are low-level workers with few or no managerial responsibilities.

Further, one of individuals represented by nodes 200-222 or an individual interacting with the individuals represented by nodes 200-222 can inspect relationship graph 200 to understand the relationship dynamics among the group of individuals represented by nodes 200-222. For example, if a salesperson is making a sales pitch to the individuals represented by nodes 200-222, the salesperson could inspect relationship graph 200 to identify the individual represented by node 212 as an individual with decision-making authority, and the salesperson could tailor their sales pitch toward the individual represented by node 212. As a further example, relationship graph 200 could be used by the individuals represented by nodes 200-212 to understand the effectiveness of their organizational hierarchy or management structure. As described with respect to the previous example, the structure of relationship graph 200 implies that the individual represented by node 212 has the highest position in an organizational hierarchy among the individuals represented by nodes 200-222. If, however, the individual represented by node 222 is designated as having highest position in the organizational hierarchy, the structure of relationship graph 200 implies that, despite their designation, the individual represented by node 222 is not who the other individuals represented by nodes 200-220 look to for leadership and/or management. In this example, the structure of relationship graph implies one or more defects in the organizational structure and/or in the managerial capabilities of the individual represented by node 222. In some examples, nodes 200-222 can be labeled according to the role of the individual represented by the node in an organizational hierarchy. A user can input labels for each node to a user interface, such as user interface 106.

Relationship graph 200, including nodes 200-222 and the depicted arrangement of nodes 200-222, is a non-limiting example and is provided for explanatory purposes. In other examples, relationship graph 200 could have a different quantity of nodes and/or the nodes of relationship graph could have a different arrangement (i.e., by having a different set of edges). Similarly, the programs stored on memory 104 (e.g., those of video processing module 120, feature extraction module 130, graphing module 140, and key feature detection module 150) can be used to create and evaluate other relationship graphs.

FIGS. 2-5 are schematic depictions of other examples of plotted relationship graphs that can be produced using graphing module 140 and used as inputs by key feature detection module 150. Like relationship graph 200, the relationship graphs depicted in FIGS. 2-5 are shown as plotted graphs. Each of FIGS. 2-5 depicts the same four individuals as nodes 272, 274, 276, 278. However, each of FIGS. 2-5 depicts an alternative arrangement and/or type of edges describing the interactions of an interacting event between the individuals represented by nodes 272-278.

Figure 2:
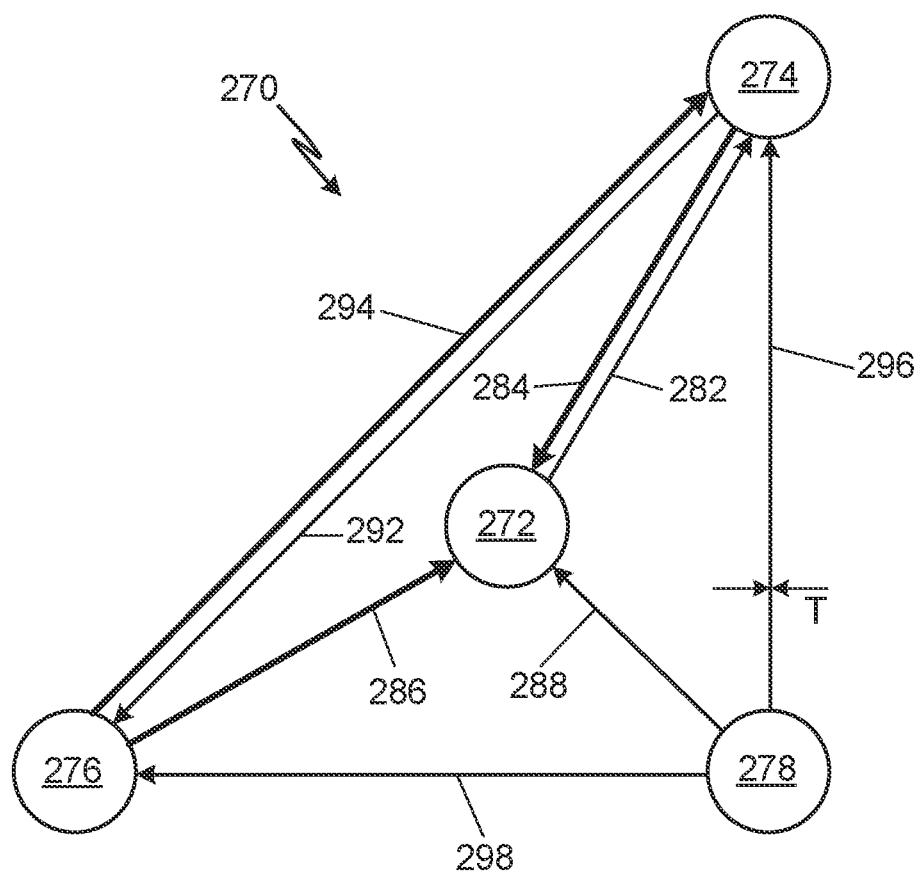
FIG. 2 is a schematic diagram of an example of a plotted relationship graph that can be created by the system of FIG. 1.

FIG. 2 is a schematic depiction of relationship graph 270, which includes nodes 272-278 and edges 282-298. Relationship graph 270 is a weighted, directed graph, such that each of edges 282-298 has a direction (indicated by an arrowhead) and a weight. In FIG. 2, each of edges 282-298 has a thickness T that is representative of the weight of the edge. Each of nodes 272, 274, 276, 278 are connected to each other of nodes 272, 274, 276, 278 by at least one of edges 282-298. Edge 282 extends from node 272 to node 274, edge 284 extends from node 274 to node 272, edge 286 extends from node 276 to node 274, edge 288 extends from node 278 to node 272, edge 292 extends from node 274 to node 276, edge 294 extends from node 276 to node 274, edge 296 extends from node 278 to node 274, and edge 298 extends from node 278 to node 276. The orientation of edges 282-298 can convey the direction of interactions between the individuals represented by nodes 272-278, among other options. For example, edge 282 can represent interactions initiated by the individual represented by node 272 and directed toward the individual represented by node 274. Similarly, edge 284 can represent interactions initiated by the individual represented by node 274 and directed toward the individual represented by node 272. As is indicated by the relative thicknesses of edges 282 and 284 (indicative of the weight of edges 282 and 284), the individual represented by node 274 initiated significantly more interactions that were directed toward the individual represented by node 272 than the individual represented by node 272 initiated in the reverse direction (i.e., toward the individual represented by node 274). Further, as is indicated by the direction of edges 292, 294, and 296, the individual represented by node 274 did not initiate interactions with the individual represented by node 278 but did initiate interactions with the individual represented by node 276. The weights of edges 292 and 284 indicate that the individual represented by node 274 initiated significantly more interactions with the individual represented by node 272 than the individual represented by node 276. Whether an individual is an initiator and/or recipient of an interaction can be determined based on the video features extracted by feature extraction module 130. Other aspects of the relationships of the individuals represented by nodes 272-278 not discussed herein can be determined based on the orientations and weights of edges 282-298.

Figure 3:
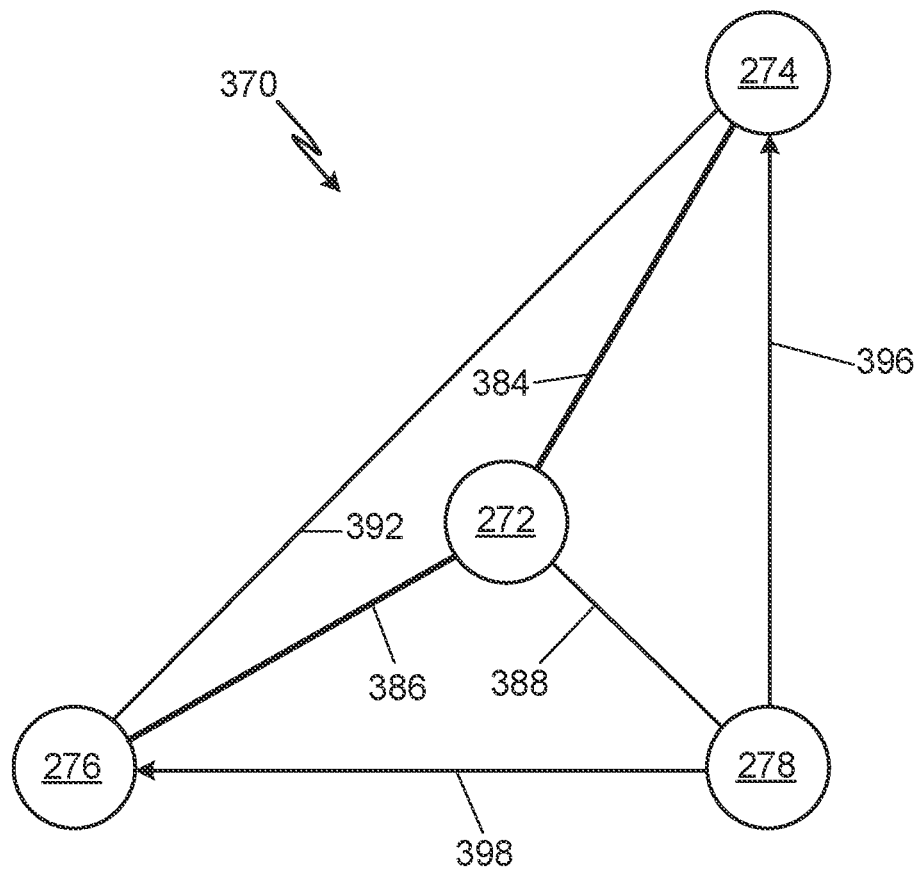
FIG. 3 is a schematic diagram of another example of a plotted relationship graph that can be created by the system of FIG. 1.

FIG. 3 is a schematic depiction of relationship graph 370, which is another example of a relationship graph that can be produced using graphing module 140. Relationship graph 370 includes nodes 272-278 connected by edges 384-398. Relationship graph 370 is a weighted and undirected graph, such that each of edges 384-398 has a weight, but unlike edges 282-298, edges 384-398 do not have directions or orientations. Like edges 282-298 (FIG. 2), each of edges 384-398 has a thickness that is representative of the weight of the edge. In FIG. 3, each of nodes 272, 274, 276, 278 are connected to each other of nodes 272, 274, 276, 278 by at least one of edges 384-398. Edge 384 extends between nodes 272 and 274, edge 386 extends between nodes 272 and 276, edge 388 extends between node 272 and node 278, edge 392 extends between nodes 274 and 276, edge 396 extends between nodes 274 and 278, and edge 398 extends between nodes 276 and 278. As edges 384-398 are unweighted, relationship graph 370 does not store information related to which individual(s) of those represented by nodes 272-278 initiated interactions and/or which individual(s) were the intended recipients of those interactions. Unweighted edges can be advantageous to describe interactions that do not have a clear initiator and/or recipient. For example, if two individuals make incidental eye contact during an interacting event, the eye contact may be a useful interaction for describing the relationship among those members of the group, but it may be difficult to discern who initiated the incidental eye contact. Relationship graph 370 condenses the quantity and/or quality of interactions between each individual into a single, weighted edge. Accordingly, relationship graph 370 conveys the overall strength of connection between the individuals represented by nodes 272-278. For the depicted example, the connection between the individuals represented by nodes 272 and 274 and the connection between the individuals represented by nodes 272 and 276 are stronger than the connections between other combinations of individuals.

Figure 4:
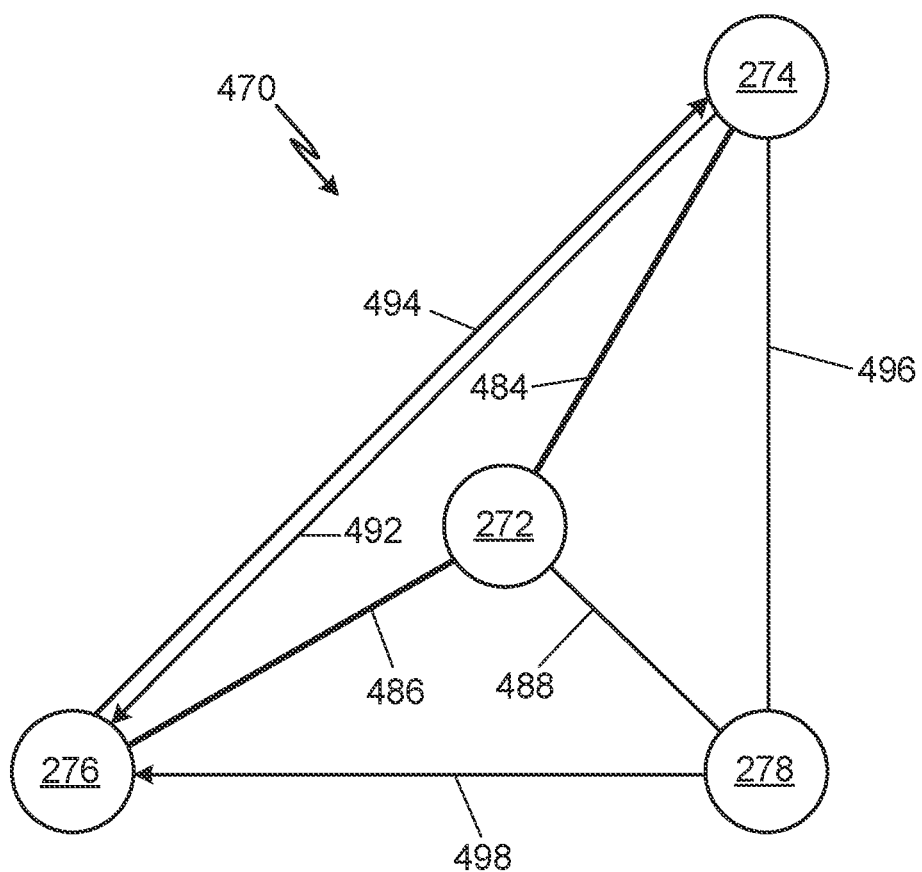
FIG. 4 is a schematic diagram of a further example of a plotted relationship graph that can be created by the system of FIG. 1.

FIG. 4 is a schematic depiction of relationship graph 470, which a further example of a relationship graph that can be produced using graphing module 140. Relationship graph 470 includes nodes 272-278 connected by edges 484-498. Relationship graph 470 is a weighted graph, such that each of edges 384-398 has a weight. Unlike relationship graphs 270 and 370 (FIGS. 2-3), however, relationship graph 470 includes a mixture of undirected and directed edges. Relationship graph 470, accordingly, is able to store information relating to video features extracted from interactions that have a discernable initiator and/or recipient and interactions that do not have a clear initiator and/or recipient. In FIG. 4, each of nodes 272, 274, 276, 278 are connected to each other of nodes 272, 274, 276, 278 by at least one of edges 484-498.

Edge 484 is undirected and extends between nodes 272 and 274, edge 486 is directed and extends from node 276 to node 278, edge 488 is undirected and extends between nodes 272 and 278, edge 492 is directed and extends from node 274 to node 276, edge 494 is directed extends from node 276 to node 274, edge 496 is undirected and extends between nodes 274 and 278, and edge 498 is directed and extends from node 278 to node 276. Edges 486, 492, and 494 are directed and, accordingly, store initiator and/or recipient information. Edges 484, 488, and 496 are unweighted and do not store initiator and/or recipient information.

The edges of the plotted depictions of relationship graphs 270, 370, and 470 in FIGS. 2-4 are weighted and can represent a combination of multiple interactions. Using relationship graph 470 (FIG. 4) as an example, edge 486 may represent a single, weighted value reflective of all interactions initiated by the individual represented by node 276 and directed to the individual represented by node 272. Combining edges allows each edge to be representative the overall connection between the individuals represented by the nodes connected by the edge. No more than two directed edges or one undirected edge extends between any pair of nodes 272-278 in relationship graphs 270, 370, and 470 (FIGS. 2-4, respectively). In other examples, it may be advantageous to combine interactions into multiple groups of interactions (e.g., by type of category of interaction) and/or to not combine some or all interactions, such that the relationship graph is a multigraph and multiple edges extend between certain pairs of nodes 272-278.

Figure 5:
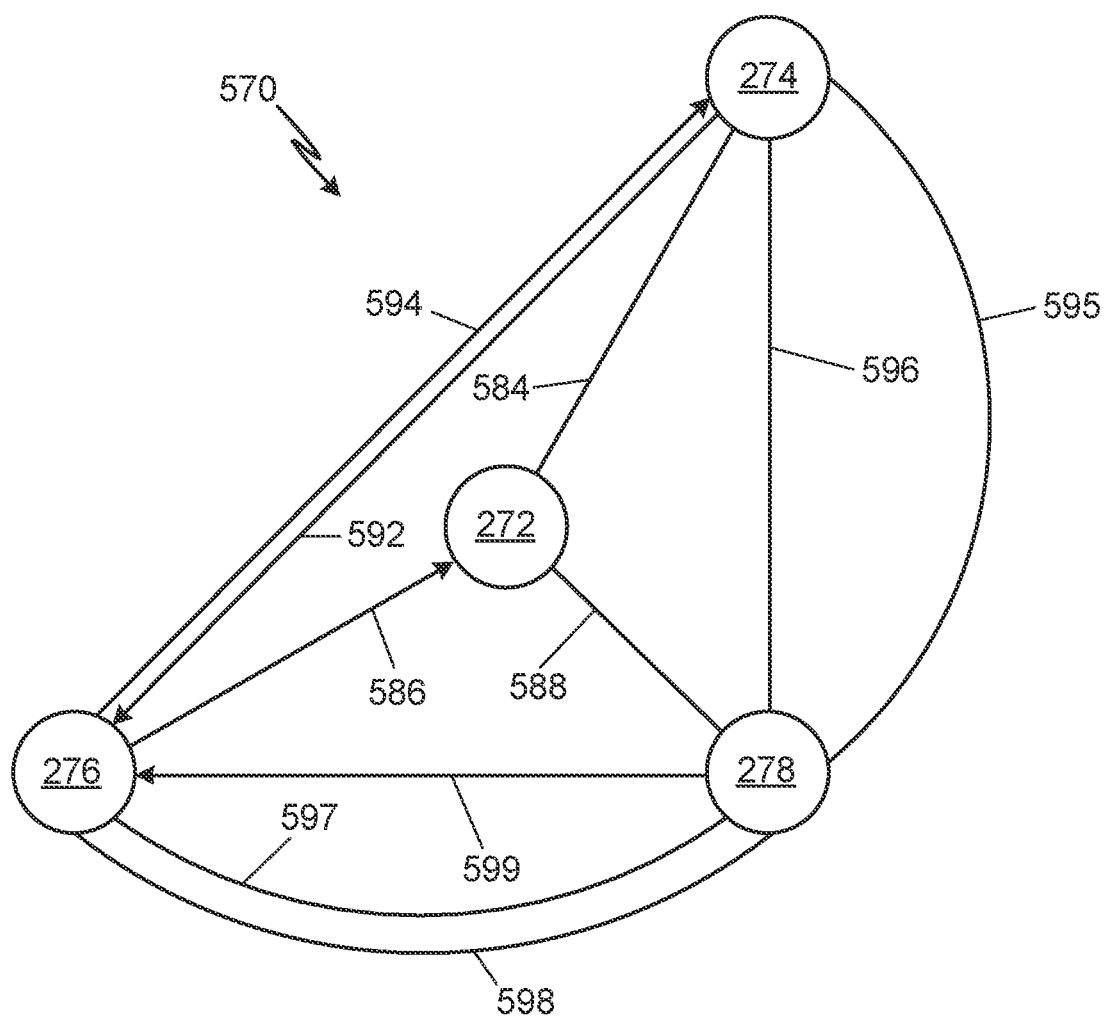
FIG. 5 is a schematic diagram of a further example of a plotted relationship graph that can be creating by the system of FIG. 1.

FIG. 5 is a schematic depiction of relationship graph 570, which is a further example of a relationship graph of an interacting event. Relationship graph 570 includes nodes 272-278 connected by edges 584-599. Relationship graph 570 is a multigraph, such that multiple edges extend between certain pairs of nodes 272-278. Accordingly, different edges extending between the same pair of nodes 272-278 can correspond to different interactions and/or different groups of interactions. Like relationship graph 470 (FIG. 4), relationship graph 570 includes a mixture of undirected and directed edges. Relationship graph 570, accordingly, is able to store information relating to video features from interactions that have a discernable initiator and/or recipient and interactions that do not have a clear initiator and/or recipient. For clarity and explanatory purposes, relationship graph 570 is not depicted as a weighted graph, but in other examples a relationship graph created by graphing module 140 can be a multigraph that includes weighted edges. Similarly, while relationship graph 570 is a multigraph that includes a combination of directed and undirected edges, graphing module 140 can also be configured to create multigraphs including only directed edges as well as multigraphs including only undirected edges.

In FIG. 5, each of nodes 272, 274, 276, 278 are connected to each other of nodes 272, 274, 276, 278 by at least one of edges 584-599. Edge 584 is undirected and extends between nodes 272 and 274, edge 586 is directed and extends from node 276 to node 272, edge 588 is undirected and extends between nodes 272 and 278, edge 592 is directed and extends from node 274 to node 276, edge 594 is directed and extends from node 276 to node 274, edges 595 and 596 are undirected and extend between nodes 274 and 278, edges 597 and 598 are undirected and extend between nodes 276 and 287, and edge 599 is directed and extends from node 278 to node 276.

As depicted in FIG. 5, a combination of directed and undirected edges can also extend between pairs of nodes of a relationship graph. Using edges 597-599 as examples, edges 597 and 598 may represent one or more interactions or video features of an interaction where there was not a clear initiator and/or recipient. Conversely, edge 599 represents one or more interactions or video features of an interaction initiated by the individual represented by node 278 and directed toward the individual represented by node 276. The edges of relationship graph 570 are arranged for explanatory purposes and in other examples, other arrangements of undirected and/or directed edges between different arrangements and/or quantities of nodes are possible.

In FIGS. 2,3, and 4, edge weight is depicted by line thickness. Line thickness is only one example of a method of conveying a numeric edge weight value, and in other examples edge weight can be conveyed or denoted in a different manner on a plotted graph. For example, one or more numerals describing the weight of the edge placed adjacent to the edge can be used to convey weight in a plotted graph.

The relationship graphs shown in FIGS. 1-5 are plotted diagrams having drawn nodes and drawn edges connecting nodes. In examples where graphing module 140 produces a plotted depiction of a relationship graph, key feature edge identification module 150 can detect the presence of key features in plotted graphs. For example, a plotted graph can be stored as an image to memory 104 and an image hash can be created from the image. Key feature detection module 150 can include one or more programs for detecting key features in image hash data, such as one or more machine learning models trained to detect the presence of key features in image hash data. In other examples, the relationship graphs produced by graphing module 140 are represented by text and/or numeric data and key feature detection module 150 is able to detect the presence of key features based on the text and/or numeric data. For example, the relationship graph created by graphing module 140 can be one or more tables or arrays describing the nodes and edges of the graph. As a specific example, the relationship graph can be a node table describing the nodes of the graph (e.g., by describing the identities or individuals the nodes correspond to) and an edge table describing the edges of the graph (e.g., by describing the video feature(s) represented by the edge and the connectivity of the edge). All video features represented by the plotted diagrams shown in FIGS. 1-5, such as edge weights or directed/undirected edge information, can be stored in as part of tabular node and edge data. Text and/or numeric data representing a relationship graph can be stored as a table, an array, and/or a database to memory 104 or another suitable storage device, including one or more physical and/or virtual storage devices, for use by key feature detection module 150. In these examples, key feature detection module 150 can include one or more programs for detecting key features represented in tabular, arrayed, and/or database formats, such as one or more trained machine learning models.

As will be explained in more detail subsequently, the relationship graphs described herein provide a flexible solution for modeling relationship dynamics within a group of individuals. The relationship graphs described herein can be constructed passively based on video data of members of the group. The use of video data, and in some examples a combination of image, audio, and semantic text data derived from the video data, allows for improved understanding of the quality of interpersonal interactions as compared to existing methods. For example, two individuals in a group may have a large number of sarcastic interactions suggestive of a negative relationship between those two individuals. An existing method may incorrectly assume that based on the volume of interactions, the individuals in fact have a strong relationship. Further, in the case of sarcasm, examining only text data of words spoken by the individuals can cause misinterpretations of the speaker's intent. The methods described herein allow for audio data of sarcastic voice tones from the video data to provide context to the semantic text data. Further, the use of relationship graphs enables representation of individual interactions and/or of the overall connection between each pair of individuals of a group. Existing methods do not provide the granular modeling of relationships and/or connections between individuals of a group provided by the relationship graphs disclosed herein.

Figure 6:
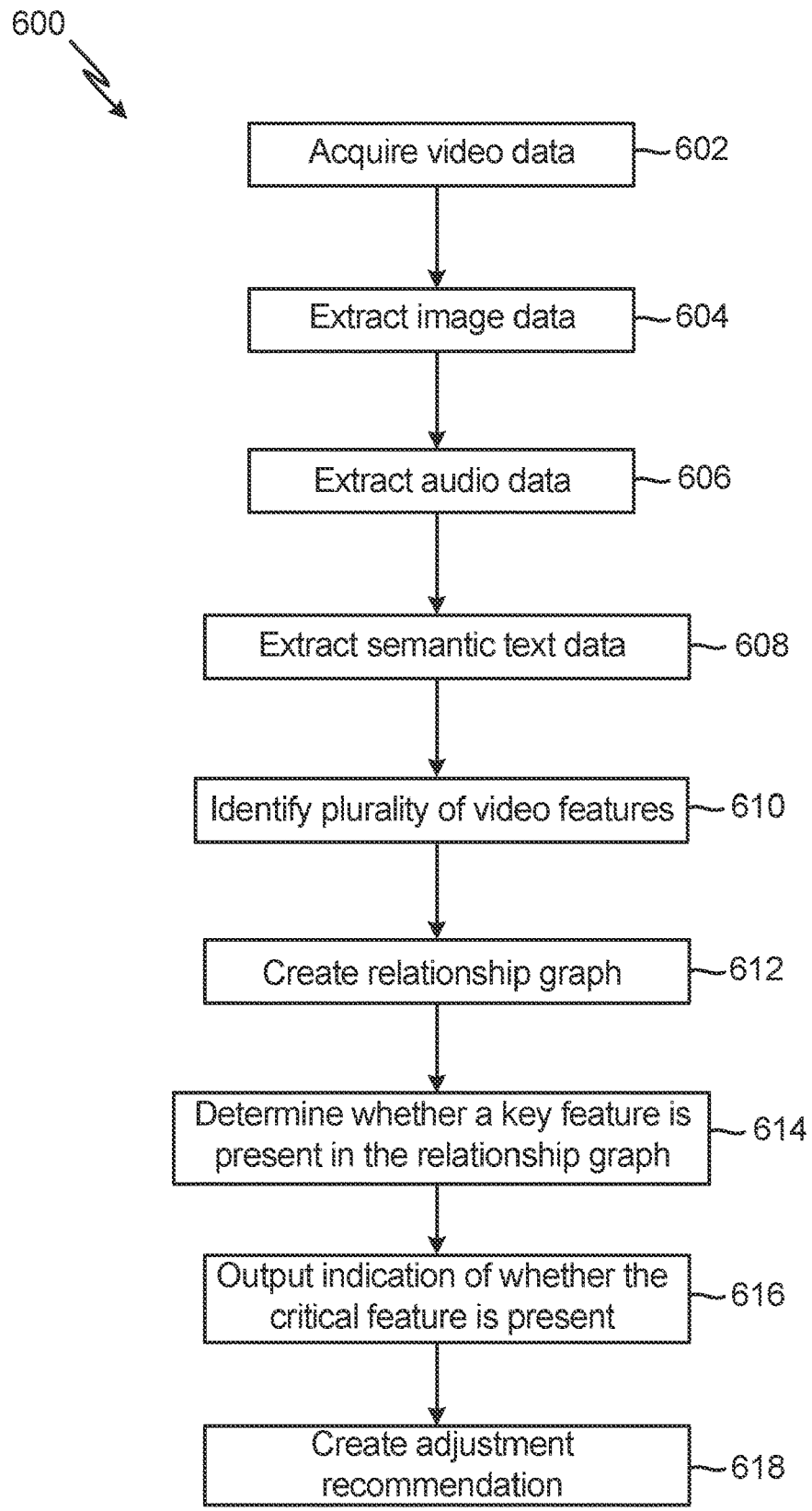
FIG. 6 is a flow diagram of an example of a method of creating relationship graphs and detecting key features in relationship graphs performable by the system of FIG. 1.

FIG. 6 is a flow diagram of method 600, which is a method creating relationship graphs and of detecting key features in relationship graphs. Method 600 is performable by relationship evaluator 100 (FIG. 1) and includes steps 602-618 of acquiring video data (step 602), extracting image data (step 604), extracting audio data (step 606), extracting semantic text data (step 608), identifying a plurality of video features (step 610), creating a relationship graph (step 612), determining whether a key feature is present in the relationship graph (step 614), outputting an indication of whether the key feature is present (step 616), and creating an adjustment recommendation (step 618). Method 600 can be stored to memory 104 of relationship evaluator 100 and executed by processor 102. For explanatory purposes, method 600 will generally be described herein with reference to relationship evaluator 100. However, method 600 can also be performed by any other suitable device or system.

In step 602, video data is acquired. The video data can be any media source having both audio and image components. The video data can be delivered to relationship evaluator 100 from a video source and/or relationship evaluator 100 can request the video data from the video source. The video source can be any suitable source of video, such as a multimedia file or a video stream. The video data can be of any length, but in some examples, the video data is sampled at pre-determined intervals for use with method 600. Method 600 can be performed for each segment of the video data and updated relationship graph data can be provided for each segment.

The video data acquired in step 602 is footage of an interacting event and includes footage of all individuals participating in the interacting event. The video data can be acquired by one or more cameras, where each camera captures video of at least one individual. The video data acquired in step 602 can, for example, one or more of video data 110A-N and be taken by a single camera 108A-N or can be taken by multiple cameras 108A-N. Each camera can capture one or more individuals. In some examples, all individuals of participating in the interacting event can be captured by a single camera (e.g., one of cameras 108A-N) and the video data captured by the camera can be used as the video data acquired in step 602. In other examples, all individuals participating in the interacting event can be captured by multiple cameras and the video data captured by those cameras can be compiled and/or aggregated to from the video data acquired in step 602.

In step 604, image data is extracted from the video data acquired in step 602. The image data is stored to memory 104 as a series of still images for use with later steps of method 600. The image data can be extracted from the video data by processor 102 of relationship evaluator 100 (FIG. 1) with one or more programs of video processing module 120. The image data extracted in step 604 includes all individuals participating in the interacting event that were captured by in the image component of the video footage. In some examples, image data for each individual captured in the video data can be separated to create sets of image data for each individual. Video features can be identified for each individual in subsequent step 610 by separately analyzing each set of image data. The image data can be separated by, for example, creating a cropped copy of the image data that only includes a single individual. Processor 102 can identify an individual from the still image data and crop each image of the still image data to include only that individual. Cropped image data sets can be created for each individual in the image data and can be separated analyzed for video features in subsequent step 610. Additionally and/or alternatively, the image data can be stored as an unseparated file and video features can be identified in subsequent step 610 from the unseparated image data. The still image data can include one image for each frame of the video data or can be sampled at a pre-determined rate. For example, the video data can be sampled once every three frames to generate the still image data.

In step 606, audio data is extracted from the video data. The audio data is extracted by processor 102 of relationship evaluator 100 (FIG. 1) with one or more programs of video processing module 120 and can be stored to memory 104 for use with later steps of method 600. In some examples, the audio data for each individual can be separated to create sets of audio data for each individual captured in the video data. In some examples, processor 102 can execute one or more programs stored on memory 104 to identify which portions of the audio data in which an individual is communicating and trim the audio data to include only those portions. Trimming the audio data can reduce the file size of the audio data, which can reduce the computational requirements to perform steps 610, 612, and/or 614. The program can be, for example, a computer-implemented machine learning model trained to identify individuals based on voices present in audio data.

Processor 102 can use one or more programs stored to memory 104 to determine which portions of the audio correspond to each individual portrayed in the image data. Processor 102 (FIG. 1) can determine which portions of the audio correspond to each individual by, for example, inspecting metadata of the video data acquired in step 602. For example, if each camera 108A-N captures footage of only a single individual 112A-N, processor 102 can associate image and audio data extracted from video data captured by each camera 108A-N. Additionally and/or alternatively, processor 102 can execute one or more programs to identify individuals present in the image data and individuals present in the audio data. The processor 102 can cross-reference a library of individuals to determine which diarized or trimmed audio files and which portions of the image data correspond to each individual, and associate audio and image data for each individual. Additionally and/or alternatively, the processor 102 can execute one or more programs to analyze the image data and determine when each individual is talking. The processor 102 can then use that timestamp information to determine which portions of the audio file correspond to the each individual and thereby associate audio and image data for each individual.

In step 608, the first semantic text data is extracted. As referred to herein, "semantic text data" refers to data that represents spoken words, phrases, sentences, and other sounds produced by the first portrayed individual as readable text. The semantic text data can be, for example, a transcript of the words spoken in the audio portion of the video data. The semantic text data can be extracted from, for example, the audio data extracted in step 606. Processor 102 of relationship evaluator 100 (FIG. 1) can use one or more programs of video processing module 120 to extract the semantic text data. Semantic text data can be extracted from the audio data using a text-to-speech program or another suitable tool and can be associated to the audio and image data for the individual. Separated semantic text data can be extracted from separated audio data for each individual and associated with the appropriate individual. In other examples, the video data can include a semantic text transcript of words, phrases, sentences, etc. spoken by one or all individuals, and first semantic text data can be extracted directly from the video data. In these examples, the semantic text data can be correlated to the correct individual in the group by, for example, comparing timestamp information to the image and audio data, by comparing the semantic text data extracted from the video data to partial semantic text information derived from an extracted audio data set, or by another suitable method.

In step 610, a plurality of video features is identified. Processor 102 can identify and extract video features from one or more of the image data extracted in step 604, the audio data extracted in step 606, and the semantic text data extracted in step 608. The plurality of video features includes classifiable features related to interactions that occurred during the interacting event and can be used to create a relationship graph in subsequent step 612. Processor 102 can inspect and identify features from one or more of the image data, the audio data, and the semantic text data extracted in steps 604, 606, and 608, respectively. The image data, audio data, semantic text data, or any combination thereof can be selected to create the plurality of features in step 610 based on application or operational need and/or based on use in generating relationship graphs that accurately depict interpersonal relationships. For example, if the group participating in the interacting event (i.e., the group of individuals depicted in the video data) is unlikely to be talking, the features identified in step 610 can include only features derived from the image data extracted in step 604. In other examples, video features derivable from the audio data, semantic text data, or a combination of image, audio, and/or text data can be omitted from the plurality of video features. Once video features have been identified from the image data, the audio data, and/or the semantic text data, processor 102 can store the plurality of features to memory 104 for use with subsequent steps of method 600.

In some examples, one or more computer-implemented machine learning models can be used to extract the plurality of video features. Each type of data extracted from the video data can be inspected using one or more software tools to identify features that can be stored to the plurality of video features. For example, a first computer-implemented machine learning model can be used to analyze image data and identify classifiable features, a second computer-implemented machine learning model can be used to analyze audio data and identify classifiable features, and a third computer-implemented machine learning model can be used to analyze semantic text data and identify classifiable features.

The image data can be analyzed using, for example, a computer vison model or another machine learning model to identify one or more body language elements that can be stored as features of plurality of features. The body language elements can include, for example, one or more of hand gestures, head tilt, the presence and amount of eye contact, the amount of eye blinking, forehead wrinkling, mouth position, mouth shape, eyebrow shape, and/or eyebrow position. The audio data can be analyzed using, for example, one or more computer-implemented machine learning models to identify features related to information conveyance and/or interpersonal interactions. For example, the features identified from the audio data can be one or more of a vocal tone, a vocal cadence, a vocal pitch, the presence of vocal quavering, intonation, inflection, sentences stress, or another audio element indicative of information conveyance, mood, emotion, or another factor or element relevant to interpersonal communication. The semantic text data can be analyzed using, for example, a natural language understanding model or another machine learning model. The features can be, for example, phonemes, words, phrases, sentences, or other units of language that convey information and are stored in the semantic text data. The features can also be, for example, an intent and/or an entity in the semantic text data. A classifiable intent can include, for example, the intended meaning of a semantic text phrase. A classifiable entity can include, for example, words, phrases, sentences, or other units of language that provide additional context to further describe or classify an intent. In some examples, the model can compare the semantic text transcript of the first portrayed individual to a library of vectorized text data to determine the content of the semantic text data.

Each of the features extracted in step 610 is associated with one or more individuals of the individuals captured in the video data acquired in step 610. Associating the video features extracted in step 610 allows for edges representative of those features to be associated with nodes representative of individuals captured in the video data, as will be explained in more detail with respect to subsequent step 612. Processor 102 can use one or more programs of feature extraction module 130 and/or graphing module 140, and/or one or more other programs stored to memory 104 to assign identities to individuals captured in the video data and to associate features with those identities. The identity information for each feature can be stored to memory 104 for use with subsequent steps of method 600.

In some examples, a feature may be directed such that it describes an interaction having a discernable initiator and/or recipient. Feature extraction module 130 can include one or more programs that allow for identification of whether a feature describes an interaction having an initiator and/or recipient and, in some examples, for identifying the initiator and/or recipient. Whether a feature has an initiator and/or recipient and the identities of the initiator and/or recipient can be stored to memory 104 for use with subsequent steps of method 600.

In step 612, a relationship graph is created. Processor 102 can use one or more programs of graphing module 140 to create the relationship graph. The relationship graph includes nodes representative of the individuals captured in the video data acquired in step 602 and edges representative of the features extracted in step 610 extending between those nodes. The number and identity of the nodes can be determined based on the identity information generated for the individuals captured in the video data. The connectivity and, in applicable examples, orientations of edges can be determined based on the identities associated with each video feature extracted by feature extraction module 130. In examples where the relationship graph is a weighted graph, edge weights can be assigned by one or more programs of graphing module 140 or another program stored to memory 104. For example, video features extracted by feature extraction module 130 can be cross-referenced with a table, array, or database that relates video features and edge weights, and the cross-referenced edge weights can be used as weights for the edges representative of those features in the relationship graph. Additionally and/or alternatively, edge weight can be determined using a computer-implemented machine learning model trained accept a video feature identity as an input and to output an edge weight. In some examples, two or more edges between two nodes can be combined. For example, all edges between nodes can be combined into a single edge representative of the relationship between the two individuals represented by the nodes. As a further example, all edges of a particular category (e.g., all edges representative of body language-related video features) can be combined into a single edge representative of that category. In these examples, the weights of the constituent edges can be combined, such as by summation, into a single value representative of the combined edge. Combining edges of the relationship graph can allow the edges to be representative of an overall connection between individuals of the group. In some examples, it may be advantageous for certain individuals to have little or no connection, and the presence of any edge between the nodes representing those individuals can be identified quickly in subsequent step 614 where the edges of the relationship graph have been combined in this manner. In further examples, the relationship graph can be plotted and a plotted depiction of the relationship graph can be stored as an image to memory 104.

In step 614, the relationship graph created in step 612 is analyzed to determine whether a key feature is present in the graph. As described previously, a key feature is a feature of a relationship graph that is associated with a positive interacting event outcome. The potential key features that can be present in a relationship graph are determined by training a classification model with relationship graphs labeled as describing interacting events with either positive or negative event outcomes. A positive event outcome can be an objective measure, such as a successful sale or a successful negotiation, among other options. A positive event outcome can also be a subjective measure, such as a highly productive meeting or a consultation believed to improve a client relationship, among other options. A negative event outcome can be, for example, failure to complete a sail, a nonproductive meeting, or a lecture resulting in poor reviews.

In some examples, step 614 can be performed by directly analyzing the graph data created in step 612. In these examples, key feature detection module 150 includes one or more programs for identifying key features based only on graph data. The one or more programs for identifying a key feature can be, for example, one or more computer-implemented machine learning detection models trained to detect one or more key features in relationship graph data. The computer-implemented machine learning model(s) can be trained using, for example, relationship graphs labeled for the presence of the key feature. The computer-implemented machine learning model(s) can also be trained using, for example, relationship graphs labeled for the presence of the key feature by determining whether one or more actions (e.g., spoken words, gestures, etc.) occurred during the interacting event that are represented by the key feature in a relationship graph and/or are analogous to those represented by the key feature in a relationship graph.

In other examples, step 614 can be performed by first extracting graph features from a relationship graph created in step 614 and the presence of a key feature can be determined by subsequently analyzing the extracted graph features for the key feature. In these examples, key feature detection module 150 includes one or more programs for extracting graph features from a relationship graph and for determining whether a key feature is present based on the extracted graph feature data. The one or more programs can be, for example, one or more computer-implemented machine learning detection models trained to detect one or more key features in extracted graph feature data. The computer-implemented machine learning model(s) can be trained using, for example, extracted graph feature data labeled for the presence of the key feature. The computer-implemented machine learning model(s) can also be trained using, for example, extracted graph feature data labeled for the key feature by determining whether one or more actions (e.g., spoken words, gestures, etc.) occurred during the interacting event that are represented by the key feature in a relationship graph and/or are analogous to those represented by the key feature in a relationship graph. More specifically, if the action(s) occurred in the interacting event, the extracted features for that event can be labeled as including the key feature and if the action(s) did not occur in the interacting event, the extracted features for that event can be labeled as not including the key feature.

In some examples, the relationship graph generated in step 612 can be converted to an image hash prior to key feature detection by the program(s) of key feature detection module 150. In these examples, key feature detection module 150 can include one or more programs for creating an image of the relationship graph generated in step 612, for creating an image hash of the relationship graph image, and for detecting key features based on image hash data. In other examples, key feature detection module 150 can be configured to detect key features based on relationship data stored as a table, array, and/or database. In these examples, key feature detection module 150 can include one or more programs for storing relationship graph information as a table, array, and/or database.

In step 616, an indication of whether the key feature is present in the relationship graph is output. The indication output in step 616 includes one or more alphanumeric characters that can convey to a user whether the key feature is present in the relationship graph. The indication can also describe one or more actions associated with the key feature. For example, the key feature may represent one or more words, one or more gestures, a vocal tone, a vocal cadence, or another action associated with causing the key feature to appear in relationship graphs. The output can include alphanumeric characters describing those action(s) to enable a person receiving the indication to try to cause the action(s) to be performed in subsequent interacting events such that the relationship graphs of those events include the key feature. Processor 102 can create the indication using one or more programs of memory 104, such as one or more programs of key feature detection module 150. The indication can then be output to a user interface, such as user interface 106 of relationship evaluator 100 (FIG. 1).

In step 618, an adjustment recommendation is output. Step 618 is optional and provides instructions for performing actions associated with causing a key feature not present in a relationship graph to be present in subsequent relationship graphs of subsequent interacting events.

In some examples, more than one graph feature may be highly predictive of a positive event outcome and/or absence of more than one graph feature may be highly predictive of a negative event outcome, such that there are multiple key features that can be detected within a relationship graph describing the event. In these examples, steps 616-618 can be repeated for all relevant key features to determine whether each key feature is present in the relationship graph and output and indication describing whether the key feature(s) are present.

The adjustment recommendation is selected to increase the likelihood that a key feature appears in subsequent relationship graphs of subsequent interacting events between the same individuals described by the relationship graph created in step 612. The adjustment recommendation includes one or more actions that can be performed by a member of the group or an individual in a managerial role relative to the group. For example, the adjustment recommendation can be an instruction to one of the individuals of the group to perform or refrain from performing one or more actions. Additionally and/or alternatively, the adjustment recommendation can be an instruction to an individual in a managerial role to take one or more actions to members of the group before a subsequent interacting event, such as talking to, counseling, or providing another intervention selected to increase the likelihood that the key feature is present in a subsequent relationship graph of a subsequent interacting event in which the members of the group participate.

As will be explained in more detail subsequently, the key features detected in relationship graphs using method 600 are selected due to the predictive power for predicting positive event outcomes when present in relationship graphs of interacting events. Accordingly, by increasing the likelihood that key features appear in subsequent relationship graphs, the adjustment recommendations generated using method 600 also increase the likelihood that those interacting events have positive event outcomes.

Memory 104 can store a table, array, and/or database that associates adjustment recommendations with key features, and processor 102 can cross-reference the table, array, and/or database to determine an adjustment recommendation associated with improving the likelihood a key feature absent from the relationship graph created in step 612 is present in a subsequent graph of a subsequent interacting event of the members of the group. The adjustment recommendation can be output by a user interface, such as user interface 106 of relationship evaluator 100 (FIG. 1).

Figure 7:
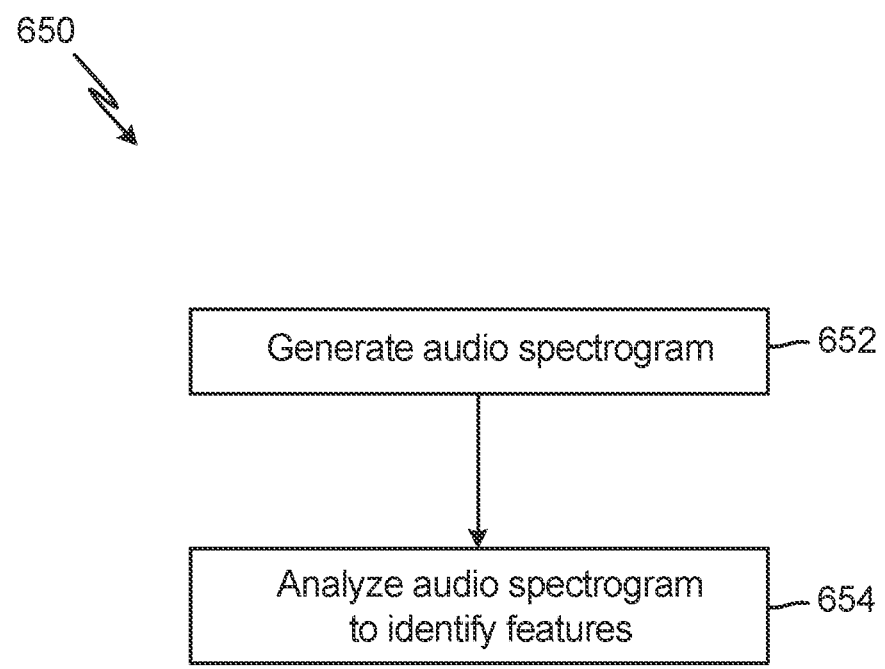
FIG. 7 is a flow diagram of an example of a method of analyzing audio data suitable for use with the method of FIG. 6.

In some examples, the audio data extracted in step 602 can be converted to an audio spectrogram and that can be analyzed in step 610 to identify the plurality of features. FIG. 7 is a flow diagram of method 650, which is a method of analyzing audio data that can be performed during steps 604 and/or 610 of method 600. Method 600 includes steps 652-654 of generating an audio spectrogram (step 652) and analyzing the audio spectrogram to identify features (step 654).

In step 652, the audio data extracted in step 606 is converted to a spectrogram. The spectrogram can describe, for example, the amplitude or frequency ranges of the audio data. In step 654, features present in the audio spectrogram are identified. The features identified in step 654 are features related to information conveyance and/or interpersonal interactions, as described previously with respect to step 610 of method 600 (FIG. 6). In some examples, processing the audio data as an audio spectrogram reduces the computational load required for a processor and/or control circuitry (e.g., processor 102 of relationship evaluator 100) to identify features in the audio data.

The key feature detection provided by method 600 advantageously allows for automatic detection of the absence of interactions that are associated with positive event outcomes. As such, the key feature detection provided by method 600 can be used by members of a group and/or individuals in managerial positions relative to the group to better understand and improve relationships among a group of individuals that repeatedly interacts. Advantageously, method 600 can be performed in an automatic manner by a suitable computer system, such as relationship evaluator 100 (FIG. 1), based only on video data of the individuals of the group interacting. As such, method 600 allows for detection of the absence of key interactions that are important for particular positive outcomes of interacting events involving the group to be performed substantially simultaneously during or immediately subsequent to the occurrence of the event. Advantageously, this allows the outputs of method 600 (e.g., the presence of the key feature or the adjustment recommendation) to be acted upon before subsequent interactions, decreasing the likelihood that those events have negative outcomes. Method 600 also allows for individuals in managerial position or other positions of authority to better understand relationships among the individuals they are managing and take steps to encourage the occurrence of key interactions that can be used to improve the outcome of interacting events of a group.

Further, as method 600 is performed automatically using a computer system (e.g., relationship evaluator 100) and video data, method 600 does not require significant human judgment or expertise to evaluate relationships and identify the absence or presence of key interactions. Accordingly, method 600 can be used by individuals having little or no expertise at understanding body language, social dynamics, or other aspects of human interaction to diagnose and improve relationships among groups they participate in and/or manage, among other options.

Figure 8:
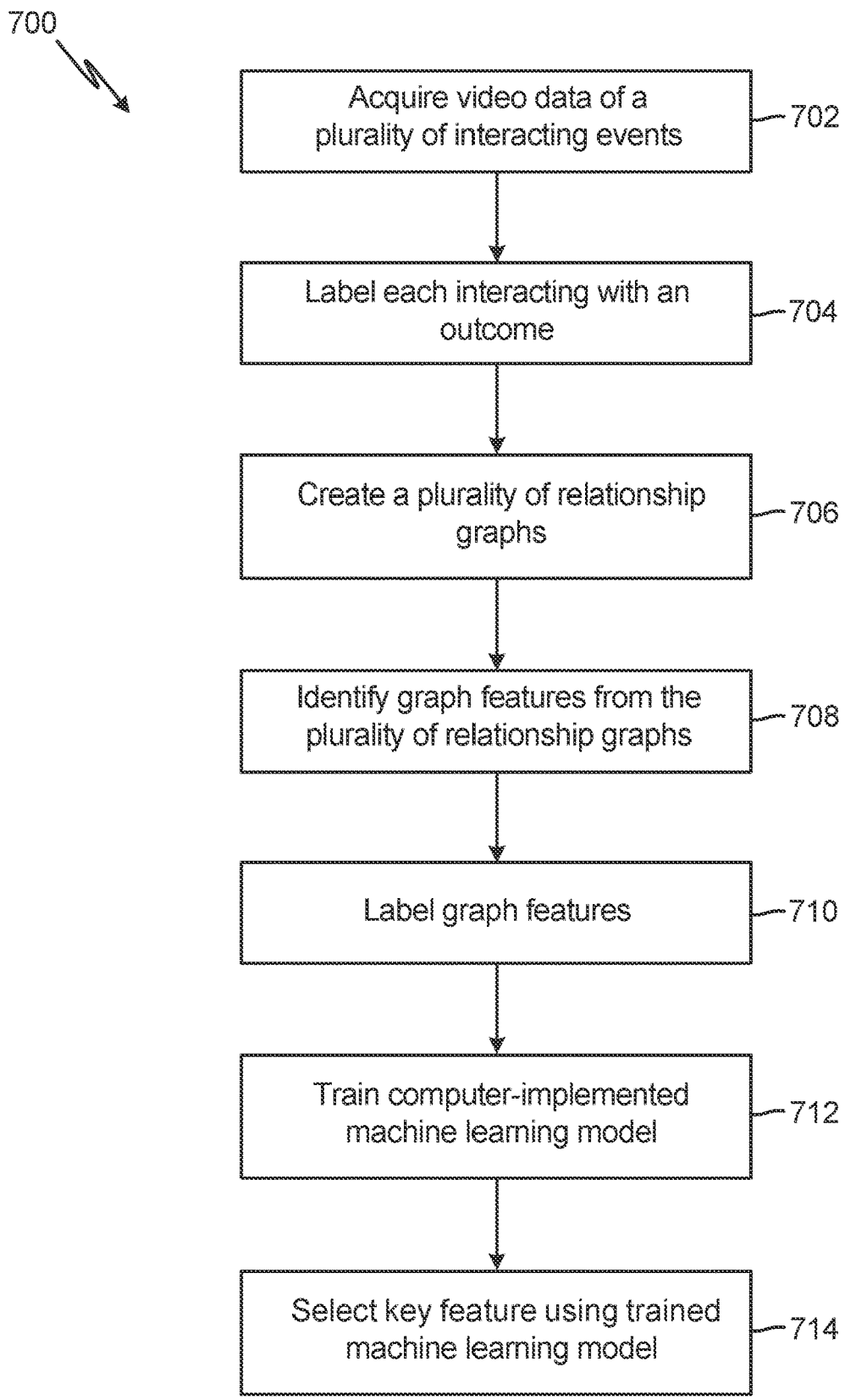
FIG. 8 is a flow diagram of an example of a method is a method of selecting key features suitable for use with the method of FIG. 6.

FIG. 8 is a flow diagram of method 700, which is a method of selecting key features for detection by method 600 (FIG. 6). Method 700 allows for key features to be selected by training a machine learning classification model and includes steps 702-710 of acquiring video data of a plurality of interacting events (step 702), analyzing each interacting event to determine an event outcome (step 704), creating a plurality of relationship graphs (step 706), identify graph features from the plurality of relationship graphs (step 708), labeling the graph features (step 710), training a computer-implemented machine learning model (step 712), and selecting a key feature using the trained computer-implemented machine learning model (step 714).

In step 702, video data of a plurality of interacting events is acquired. The video data includes image and audio components and depicts interacting events between two or more individuals. In some examples, each interacting event depicted by the video data includes the same individuals, improving the ease with which key features selected by method 700 can be detected in subsequent relationship graphs. In other examples, the interacting events depicted by the video data include varied groups of individuals, potentially increasing the range of individuals for which the key features selected by method 700 may be able to accurately predict positive event outcomes. Additionally and/or alternatively, the video data can depict a variety of types of interacting events, also potentially increasing the range of interacting event types for which the key features selected by method 700 may be able to accurately predict positive event outcomes.

In step 704, each interacting event is analyzed to determine an event outcome for the interacting event. A human operator can analyze each interacting event to determine whether a particular interacting event resulted in a positive or negative outcome. Interacting events that do not clearly result in positive or negative event outcomes can optionally be excluded from further steps of method 700.

In step 706, a relationship graph is created for each interacting event. The relationship graphs created in step 706 can be created by performing steps 602-612 of method 600 for each interacting event for which an event outcome was determined in step 704. Each relationship graph created in step 706 includes nodes representative of the individuals participating in the interacting event represented by the graph and edges connecting those nodes that are representative of interactions that occurred during the interacting event.

In step 708, graph features are extracted from the relationship graphs created in step 708. The graph features can be, for example, edges of the relationship graphs, arrangements of nodes of the relationship graphs, and/or combinations of edges and/or nodes, among other options. The graph features can be extracted by, for example, one or more programs configured to extract the edges, the arrangement of nodes, and/or particular combinations of nodes and/or edges from a relationship graph. The graph features can also be extracted by one or more computer-implemented machine learning programs trained to identify features in relationship graphs.

In step 710, the graph features in step 710 are labeled. The graph features are labeled as associated with either positive or negative event outcomes based the event outcomes determined in step 704. More specifically, the graph features extracted from a particular relationship graph are labeled with the event outcome for the interacting event depicted by the relationship graph.

In step 712, a computer-implemented machine learning model is trained with the labeled graph features. The machine learning model is any model capable of classifying graph features according to a decision tree, such that training the machine learning model results in the creation of a decision tree that can be used to classify graph features as associated with positive and/or negative event outcomes. The machine learning model can be trained using any suitable manner and, in some examples, is trained using method 800, discussed subsequently with respect to FIG. 9.

In step 714, a key feature is selected based on the decision tree created in step 712. The key feature is any graph feature (e.g., any edge(s), node(s) or combination thereof) that is highly predictive of positive event outcomes when present in a relationship graph according to the decision tree created by training the classification model. The key features selected from a decision tree created according to steps 702-712 can be those having a predictive power above a particular threshold value. The threshold value can be determined according to user preference and/or operational need. In at least some examples, the absence of the key feature from a relationship graph is also predictive of negative event outcomes. The key features identified by method 700 can be stored to a memory, such as memory 104, for use with method 600. The action(s) and/or individual(s) associated with the edge(s) and/or node(s) of the key feature(s) can also be stored to a memory, such as memory 104.

The action(s) and/or individual(s) can be used to create an adjustment recommendation for causing the key feature to appear in relationship graphs of future interacting events. For example, the adjustment recommendation can be formulated as instructions for performing the action(s) and, in some examples, the individual(s) upon whom the action(s) should be performed and/or the individual(s) who should perform the action(s).

Advantageously, method 700 allows for the automatic selection of key features in complex relationship graphs having many nodes and many edges by extracting graph features and using those features to train a classification model. The key features selected by method 700 can be used with method 600 as the key features detected in subsequent relationship graphs. As the key features identified by method 700 are associated with positive event outcomes, adjustment recommendations for increasing the likelihood that the key feature appear in relationship graphs also increases the likelihood that subsequent events have positive event outcomes.

Further, as method 700 selects key features by training a classification model, method 700 reduces and/or eliminates the need for subjective human judgment to understand what elements of an interacting are important for a positive outcome. Accordingly, the key features identified by method 700 are significantly more accurate at predicting positive event outcomes than conventional methods relying on subjective judgment.

Figure 9:
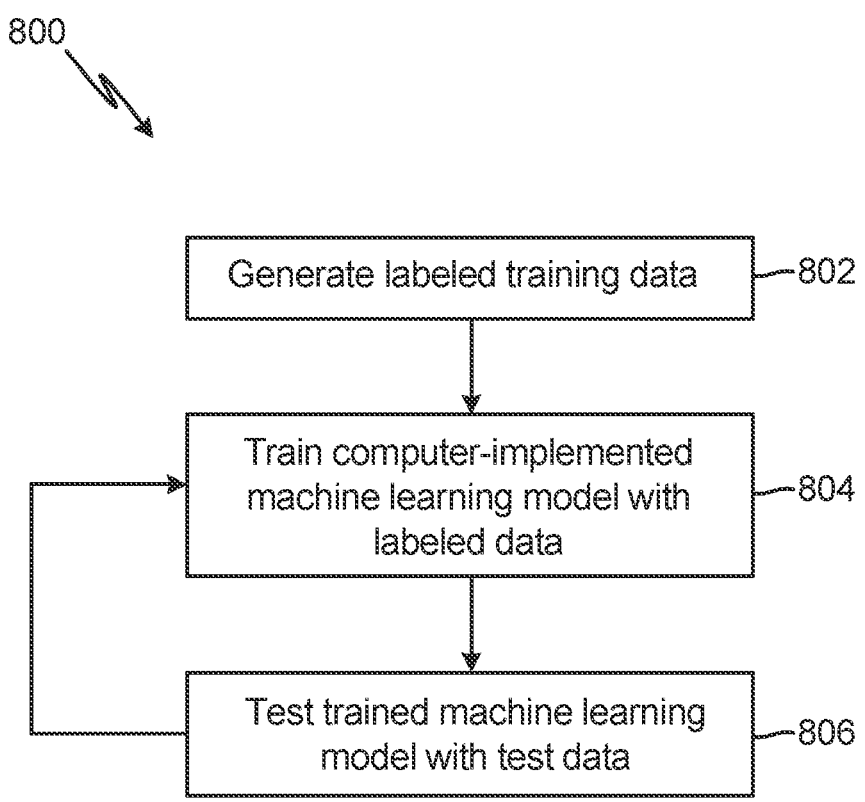
FIG. 9 is a flow diagram of an example of a method of performing supervised training of a computer-implemented machine learning model.

FIG. 9 is a flow diagram of method 800, which is a method of supervised training of a computer-implemented machine learning model for use with other methods of this disclosure. Method 800 includes steps 802-806 of generating labeled training data (step 802), training the computer-implemented machine learning model with the labeled data (step 804), and testing the trained computer-implemented machine learning model with test data (step 806). Method 800 can be used to train any machine learning model described herein (e.g., for a machine learning model for identifying and extracting features, for a machine learning model for creating relationship graphs, for a machine learning model for detecting key graph features, etc.) but will be discussed with respect to a generic machine learning model for explanatory purposes.

In step 802, labeled data is generated. The labeled data can be generated by tagging a data with one or more labels describing the data. For example, where the labeled data is a set of relationship graphs, each relationship graph can be tagged with a label describing the outcome of the interacting event described by the relationship graph. The labeled data can be, for example, labeled video data. The labeled data can also be, for example, audio data, image data, semantic text data, or labeled outputs of another trained machine learning model. The labeled data can be one or more features used to create a relationship graph via, for example, method 600. The labeled data can also be labeled graph feature data used to train a classification model with method 700.

In step 804, the labeled data is used to train the computer-implemented machine learning model. As used herein, "training" a computer-implemented machine learning model refers to any process by which parameters, hyper parameters, weights, and/or any other value related model accuracy are adjusted to improve the fit of the computer-implemented machine learning model to the training data. The labeled data can be transformed by, for example, one or more programs and/or one or more other trained machine learning models before it is used for training in step 804.

In step 806, the trained computer-implemented machine learning model is tested with test data. The test data used in step 806 is unlabeled data that is used to qualify and/or quantify performance of the trained computer-implemented machine learning model. More specifically, a human or machine operator can evaluate the performance of the machine learning model by evaluating the fit of the model to the test data. Step 806 can be used to determine, for example, whether the machine learning model was overfit to the labeled data during model training in step 804.

As depicted in FIG. 9, steps 804 and 806 can be performed iteratively to improve the performance of the machine learning model. More specifically, if the fit of the model to the unlabeled data determined in step 804 is undesirable, step 806 can be repeated to further adjust the parameters, hyper parameters, weights, etc. of the model to improve the fit of the model to the test data. Step 806 can then be repeated with a new set of unlabeled test data to determine how the adjusted model fits the new set of unlabeled test data. If the fit continues to be undesirable, further iterations of steps 804 and 806 can be performed until the fit of the model becomes desirable.

As described previously, the methods and systems disclosed herein provide significant advantages for identifying key features for interacting events and detecting those key features in relationship graphs of interacting events. The methods and systems disclosed herein also allow for the automatic generation of recommendations for improving the likelihood that those key features appear in subsequent interacting events, potentially improving the outcomes of those interacting events. Advantageously, the methods and systems described herein allow for key features to be selected and detected based only on video data of an interacting event, and can be performed in an automated manner by one or more computer systems (e.g., relationship evaluator 100), thereby providing a more objective method of evaluating interpersonal relationships than conventional methods that rely on subjective judgment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:

1. A method comprising:
acquiring training video data that portrays a plurality of training interacting events;
labeling each training interacting event of the plurality of training interacting events as positive or negative to create a plurality of positive interacting events and a plurality of negative interacting events;
creating a plurality of positive training relationship graphs by, for each positive interacting event of the plurality of positive interacting events:
extracting positive training image data, positive training audio data, and positive training semantic text data from the training video data;
analyzing, by a first computer-implemented machine learning model, at least one of the positive training image data, the positive training audio data, and the positive training semantic text data to identify a plurality of positive training video features; and
analyzing the plurality of positive training video features to create a positive relationship graph, wherein the positive relationship graph includes a plurality of positive training nodes and a plurality of positive training edges extending between nodes of the plurality of positive training nodes;
creating a plurality of negative training relationship graphs by, for each negative interacting event of the plurality of negative interacting events:
extracting negative training image data, negative training audio data, and negative semantic text data from the training video data;
analyzing, by the first computer-implemented machine learning model, at least one of the negative training image data, the negative training audio data, and the negative semantic text data to identify a plurality of negative training video features;
analyzing the plurality of negative training video features to create a negative relationship graph, wherein the negative relationship graph includes a plurality of negative training nodes and a plurality of negative training edges extending between nodes of the plurality of negative training nodes;
analyzing the plurality of positive training relationship graphs to identify a plurality of positive graph features;
analyzing the plurality of negative training relationship graphs to identify a plurality of negative graph features;
training a second computer-implemented machine learning model to identify positive and negative interacting events using the plurality of positive graph features and the plurality of negative graph features;
identifying a first key feature using the trained second computer-implemented machine learning model;
acquiring digital video data that portrays an interacting event, the interacting event comprising a plurality of interactions between a plurality of individuals;
extracting image data, audio data, and semantic text data from the video data;
analyzing, by the first computer-implemented machine learning model, at least one of the image data, the audio data, and the semantic text data to identify a plurality of video features;
analyzing the plurality of video features to create a relationship graph, wherein:
the relationship graph comprises a plurality of nodes and a plurality of edges;
each node of the plurality of nodes represents an individual of the plurality of individuals;
each edge of the plurality of edges extends between two nodes of the plurality of nodes; and
the plurality of edges represents the plurality of interactions;
determining whether the first key feature is present in the relationship graph, wherein presence of the first key feature is predictive of a positive outcome of the interacting event; and
outputting, by a user interface, an indication whether the first key feature is present in the relationship graph.

2. The method of claim 1, wherein, according to the trained second computer-implemented machine learning model, the first key feature has a first predictive power above a threshold predictive power for predicting whether a training interacting event of the plurality of training interacting events is a positive interacting event of the plurality of positive interacting events.

3. The method of claim 2, wherein each video feature of the plurality of video features is associated with an interaction of the plurality of interactions, and each video feature of the plurality of video features is associated with at least one individual of the plurality of individuals.

4. The method of claim 3, and further comprising outputting an adjustment recommendation for improving a subsequent outcome of a subsequent interacting event.

5. The method of claim 4, wherein the adjustment recommendation comprises instructions for performing an action that, when performed, is associated with causing the key feature to be present in a subsequent relationship graph of the subsequent interacting event.

6. The method of claim 5, wherein determining whether the first key feature is present in the relationship graph comprises:
  converting the relationship graph to tabulated data; and
  determining whether the first key feature is present based on the tabulated data.

7. The method of claim 5, wherein determining whether the first key feature is present in the relationship graph comprises:
  hashing an image of the relationship graph to create an image hash; and
  determining whether the first key feature is present based on the image hash.

8. The method of claim 5, and further comprising identifying a second key feature using the trained second computer-implemented machine learning model, wherein, according to the trained second computer-implemented machine learning model, the second key feature has a second predictive power for predicting positive training relationship graphs above the threshold predictive power.

9. The method of claim 8, and further comprising:
  determining whether the second key feature is present in the relationship graph;
  outputting, by a user interface, an indication whether the second key feature is present in the relationship graph.

10. The method of claim 9, wherein analyzing the plurality of video features to create the relationship graph comprises analyzing the plurality of video features with a third computer-implemented machine learning model.

11. The method of claim 1, wherein analyzing, by the first-computer-implemented machine learning model, at least one of the image data, audio data, and semantic text data to identify the plurality of video features comprises identifying the plurality of video features by:
  analyzing the image data with the first computer-implemented machine learning model;
  analyzing the audio data with a third computer-implemented machine learning model; and
  analyzing the semantic text data with a fourth computer-implemented machine learning model.

12. The method of claim 11, wherein analyzing the plurality of features to create the relationship graph comprises analyzing the plurality of features with a fifth computer-implemented machine learning model to create the relationship graph.

13. A system comprising:
  a camera device for acquiring digital video data;
  a processor;
  a user interface; and
  a memory encoded with instructions that, when executed, cause the processor to:
    receive training video data that portrays a plurality of training interacting events, wherein each training interacting event of the plurality of training interacting events is labeled as positive or negative, such that the plurality of training interacting events comprises a plurality of positive interacting events and a plurality of negative interacting events;
    create a plurality of positive training relationship graphs by, for each positive interacting event of the plurality of positive interacting events:
      extracting positive training image data, positive training audio data, and positive training semantic text data from the training video data;
      analyzing, by a first computer-implemented machine learning model, at least one of the positive training image data, the positive training audio data, and the positive training semantic text data to identify a plurality of positive training video features; and
      analyzing the plurality of positive training video features to create a positive relationship graph, wherein the positive relationship graph includes a plurality of positive training nodes and a plurality of positive training edges extending between nodes of the plurality of positive training nodes;
    create a plurality of negative training relationship graphs by, for each negative interacting event of the plurality of negative interacting events:
      extracting negative training image data, negative training audio data, and negative semantic text data from the training video data;
      analyzing, by the first computer-implemented machine learning model, at least one of the negative training image data, the negative training audio data, and the negative semantic text data to identify a plurality of negative training video features; and
      analyzing the plurality of negative training video features to create a negative relationship graph, wherein the negative relationship graph includes a plurality of negative training nodes and a plurality of negative training edges extending between nodes of the plurality of negative training nodes;
    analyze the plurality of positive training relationship graphs to identify a plurality of positive graph features;
    analyze the plurality of negative training relationship graphs to identify a plurality of negative graph features;
    train a second computer-implemented machine learning model to identify positive and negative interacting events using the plurality of positive graph features and the plurality of negative graph features;
    identify a first key feature using the trained second computer-implemented machine learning model;
    acquire digital video data from the camera, wherein the digital video data portrays an interacting event comprising a plurality of interactions between a plurality of individuals;
    extract image data, audio data, and semantic text data from the digital video data;
    analyze, by the first computer-implemented machine learning model, at least one of the image data, the audio data, and the semantic text data to identify a plurality of video features in the digital video data;
    analyze the plurality of video features to create a relationship graph, wherein:
      the relationship graph comprises a plurality of nodes and a plurality of edges;
      each node of the plurality of nodes represents an individual of the plurality of individuals;
      each edge of the plurality of edges extends between two nodes of the plurality of nodes; and
      the plurality of edges represents the plurality of interactions;
    determine whether the first key feature is present in the relationship graph, wherein presence of the first key feature is predictive of a positive outcome of the interacting event;
    output, by the user interface, an indication of whether the first key feature is present in the relationship graph.

14. The system of claim 13, and further comprising outputting an adjustment recommendation for improving a subsequent outcome of a subsequent interacting event, wherein the adjustment recommendation comprises instructions for performing an action that, when performed, is associated with causing the key feature to be present in a subsequent relationship graph of the subsequent interacting event.

15. The system of claim 14, wherein the instructions, when executed, cause the processor to:
convert the relationship graph to tabulated data; and
determine whether the first key feature is present in the relationship graph based on the tabulated data.

16. A method comprising:
acquiring training video data that portrays a plurality of interacting events;
labeling each interacting event of the plurality of interacting events as positive or negative to create a plurality of positive interacting events and a plurality of negative interacting events;
creating a plurality of positive relationship graphs by, for each positive interacting event of the plurality of positive interacting events:
extracting positive training image data, positive training audio data, and positive semantic text data from the training video data;
analyzing, by the first computer-implemented machine learning model, at least one of the positive training image data, the positive training audio data, and the positive semantic text data to identify a plurality of positive training video features;
analyzing the plurality of positive training video features to create a positive relationship graph, wherein the positive relationship graph includes a plurality of positive training nodes and a plurality of positive training edges extending between nodes of the plurality of positive training nodes;
creating a plurality of negative relationship graphs by, for each negative interacting event of the plurality of negative interacting events:
extracting negative training image data, negative training audio data, and negative semantic text data from the training video data;
analyzing, by the first computer-implemented machine learning model, at least one of the negative training image data, the negative training audio data, and the negative semantic text data to identify a plurality of negative training video features;
analyzing the plurality of negative training video features to create a negative relationship graph, wherein the negative relationship graph includes a plurality of negative training nodes and a plurality of negative training edges extending between nodes of the plurality of negative training nodes;
analyzing the plurality of positive relationship graphs to identify a plurality of positive graph features;
analyzing the plurality of negative relationship graphs to identify a plurality of negative graph features;
training a second computer-implemented machine learning model to identify positive and negative interacting events with the plurality of positive graph features and the plurality of negative graph features;
identifying a key feature using the trained second computer-implemented machine learning model, wherein, according to the trained second computer-implemented machine learning model, the key feature has a predictive power above a threshold predictive power
creating a new relationship graph of a new interacting event, the new interacting event comprising a new plurality of interactions between a new plurality of individuals, wherein:
the new relationship graph comprises a new plurality of nodes and a new plurality of edges;
each node of the new plurality of new nodes represents an individual of the new plurality of individuals;
each edge of the new plurality of edges extends between two nodes of the plurality of new nodes; and
the new plurality of edges represents the new plurality of interactions;
determining whether the key feature is present in the new relationship graph; and
outputting, by a user interface, whether the key feature is present in the new relationship graph.

17. The method of claim 16, wherein the key feature is predictive of negative interacting events.

18. The method of claim 16, wherein the key feature is predictive of positive interacting events.

* * * * *